US012368303B2

(12) United States Patent
Han

(10) Patent No.: US 12,368,303 B2
(45) Date of Patent: Jul. 22, 2025

(54) CONVERTING VARIABLE RENEWABLE ENERGY TO CONSTANT FREQUENCY ELECTRICITY BY VOLTAGE-CONTROLLED SPEED CONVERTER

(71) Applicant: Kyung Soo Han, Timonium, MD (US)

(72) Inventor: Kyung Soo Han, Timonium, MD (US)

(73) Assignee: Differential Dynamics Corporation, Owings Mills, MD (US)

( * ) Notice: Subject to any disclaimer, the term of this patent is extended or adjusted under 35 U.S.C. 154(b) by 286 days.

(21) Appl. No.: 18/146,746

(22) Filed: Dec. 27, 2022

(65) Prior Publication Data

US 2023/0261475 A1 Aug. 17, 2023

Related U.S. Application Data

(63) Continuation-in-part of application No. 17/666,985, filed on Feb. 8, 2022.

(60) Provisional application No. 63/295,075, filed on Dec. 30, 2021, provisional application No. 63/219,579, filed on Jul. 8, 2021.

(51) Int. Cl.
  *H02J 3/38* (2006.01)
(52) U.S. Cl.
  CPC .................................. *H02J 3/381* (2013.01)
(58) Field of Classification Search
  CPC .... H02P 9/04; F03B 1/00; F03B 17/06; G05F 1/12; H02J 3/381; H02J 2300/24; H02J 2300/28; H02J 2300/40; F05B 2270/304; F05B 2220/705; F05B 2220/7066; F05B 2260/40; F05B 2260/4031
  See application file for complete search history.

(56) References Cited

U.S. PATENT DOCUMENTS

| | | |
|---|---|---|
| 8,485,933 B2 | 7/2013 | Han |
| 8,702,552 B2 | 4/2014 | Han |
| 8,986,149 B2 | 3/2015 | Han |
| 8,992,370 B2 | 3/2015 | Han |
| 9,476,401 B2 | 10/2016 | Han |
| 9,490,736 B2 | 11/2016 | Han |
| 9,506,534 B2 | 11/2016 | Han |

(Continued)

FOREIGN PATENT DOCUMENTS

WO WO2020/139863 7/2020

*Primary Examiner* — Bickey Dhakal
(74) *Attorney, Agent, or Firm* — Shih IP Group, PLLC; Thomas Jackson; Theodore Shih

(57) ABSTRACT

A wind, river, tidal, or ocean current harnessing module harnesses a value of energy from variable water or wind flow. A water, river or wind turbine or a solar panel may generate variable direct current electrical voltage or variable alternating current. The harnessing module harnesses variable wind, water and solar renewable energy and is connected to a feed forward and feedback voltage regulator apparatus of, for example, a land module and the voltage regulator automatically provides a control voltage to a control motor for a dual ring gear speed converter. Received variable electric power input from harnessing modules is fed forward to the voltage regulator. Variable frequency output of an output generator is corrected by feeding back sampled voltage output of the output generator to the voltage regulator.

10 Claims, 15 Drawing Sheets

(56) References Cited

U.S. PATENT DOCUMENTS

| | | | |
|---|---|---|---|
| 10,378,506 B2 | 8/2019 | Han | |
| 10,815,968 B2 | 10/2020 | Han | |
| 10,941,749 B2 | 3/2021 | Han | |
| 11,111,898 B2 | 9/2021 | Han | |
| 2018/0195582 A1* | 7/2018 | Han | ........................ F16H 3/724 |
| 2020/0095974 A1* | 3/2020 | Han | ........................ F03B 13/10 |
| 2020/0191120 A1* | 6/2020 | Han | ...................... F03B 13/264 |

* cited by examiner

1. Wind Frequency
2. Harnessed Usable Power
3. Wind Energy = (1) · (2)
4. Power harnessed in Ranges I & II
5. Significant amount of wind energy in Ranges I & II: Variable
6. Constant Rated Power in Range III

CONVERTING VARIABLE RENEWABLE ENERGY TO CONSTANT FREQUENCY ELECTRICITY BY VOLTAGE-CONTROLLED SPEED CONVERTER This application is a continuation-in-part of pending, un-published U.S. patent application Ser. No. 17/666,985, filed Feb. 8, 2022, entitled "Converting Variable Renewable Energy to Constant Frequency Electricity by a Voltage Regulated Speed Converter, a Voltage-Controlled Motor Generator Set or a Voltage Converter" of Kyung Soo Han which application claims the benefit of priority of provisional U.S. Patent Application Ser. No. 63/219,579 filed Jul. 8, 2021, also titled "Converting Variable Renewable Energy to Constant Frequency Electricity by a Voltage Regulated Speed Converter, a Voltage-Controlled Motor Generator Set or a Voltage Converter" of Kyung Soo Han and also claims the benefit of priority of provisional U.S. Patent Application Ser. No. 63/295,075 filed Dec. 30, 2021, also titled "Converting Variable Renewable Energy to Constant Frequency Electricity by a Voltage Regulated Speed Converter, a Voltage-Controlled Motor Generator Set or a Voltage Converter" of Kyung Soo Han, all the above-referenced patent applications incorporated by reference as to their entire contents.

TECHNICAL FIELD

The technical field of the invention relates to providing a method and apparatus for controlling the harnessing of wind and water flow renewable energy to constant frequency electricity with a wind, river, ocean, or tidal turbine or a solar panel by use of a voltage regulator with electrical inputs from a harnessing module delivering a feedforward harnessed variable electrical voltage to an input motor, and a feedback variable voltage value from a variable electric load via an output generator to a voltage regulator, the voltage regulator for regulating delivery of control voltage for running one or two control motors, and an input motor for delivery of the feed forward harnessed variable electrical energy to a dual ring gear speed converter, a spur gear speed converter assembly or both for outputting optimal generated electric voltage and frequency to service a grid having a variable load.

BACKGROUND OF THE INVENTION

Referring to prior art FIG. 1 of the present patent application, there is shown a comparison of Pascal's Principle for operation of a closed hydraulic system having three variables: Force equals pressure multiplied by area A, over which area A, the pressure P is distributed. When the hydraulic system is a closed system, the pressure P is constant. The figure of a closed hydraulic system below the nine-step recitation of Pascal's Principle demonstrates a small $F_1$ controls force acting over a small area $A_1$. If force $F_1$ applied to a small area $A_1$ spread over a large area $A_2$, then, force $F_2$ which is greater than $F_1$ can lift a car. A mechanical advantage is achieved because the lifting force $F_2$ of the automobile is greater than the small force $F_1$ applied over a smaller area $A_1$ than $A_2$. Force "F" per step 9, is a conditional variable, the force being excerpted to a fluid container (wavy lines representing fluid). The fluid container must be adequately strong enough to support the system (the fluid and automobile) or "F" is a conditional variable. Pascal's Principle for a Closed Hydraulic System and a related principle, namely Han's Principle for a Balanced Rotary Speed System, are described in prior art U.S. Pat. No. 10,941,749 ("the '749 patent"), issued Mar. 9, 2021, entitled "Speed Converter Controlled River Turbines," and incorporated by reference as to its entire contents. (See FIGS. 6F1 and 6F2 which are duplicated in prior art FIG. 1 of the present application). According to inventor, Kyung Soo Han, the depicted Han's Principle, also having nine steps, applies to a balanced rotary speed system also having three variables (like Pascal): Power equals torque multiplied by speed per steps 1, 2 ($P=\tau\omega$). If torque $\tau$ is constant, per step 3, then, a speed and torque mechanically balanced system results such that a power $P_1$, large input power, (for example, a mechanical power $P_1$ received as a wind or water flow by a harnessing module of renewable electric energy) is received by an input shaft meshed with a known prior art "hummingbird speed converter" (discussed in greater detail herein) which may comprise first and second spur gear assemblies or first and second ring gear assemblies driven by the mechanical input $P_1$ from an input motor (not shown) powered by a renewable energy harnessing module (not shown). A mechanical control power $P_2$ is received from a control motor (not shown) and provides a rotational speed control value from the control motor. An output power level of $P_3$, greater than control power $P_2$, per step 8, is output to a shaft rotating at a rotational speed $\omega_3$ greater than the control rotational speed providing an electrical advantage. $P_3$ is greater than $P_2$ when $\omega_3$ is greater than $\omega_2$, per step 7 and per step 8, P. Control power $P_2$ for applying a mechanical speed control to a spur/helical gear "hummingbird speed converter" comprising first and second spur gear (or first and second ring gear) assemblies creates an electrical advantage such that, if the mechanical rotational speed $P_3$ output power is provided to an electricity generator (not shown), the electrical power output by the generator exceeds the control power $P_2$. If the rotational speed of the output shaft exceeds the rotational speed of a control motor (not shown) driving the control shaft connected to the control motor, then, output power $P_3$ exceeds control power $P_2$, per step 8, and an electrical advantage result such that more electrical power $P_3$ is generated than control power $P_2$ supplied by the control motor (not shown). The input power $P_1$, per step 9, is also a conditional variable meaning that the output $P_3$ has to be greater than the control power $P_2$ and the input power $P_1$ used during the process, just as the amount of input force "F" in a closed hydraulic system (Pascal's Principle, step 9)), is a conditional variable. Yet, per Han's principle, the larger the harnessed input power $P_1$ by a renewable energy harnessing module, the more input power may be converted to grid power (not shown).

Pascal's Principle for a Closed Hydraulic System and a related principle, namely Han's Principle for a Balanced Rotary Speed System, are described in prior art U.S. Pat. No. 10,941,749 ("the '749 patent"), issued Mar. 9, 2021, entitled "Speed Converter Controlled River Turbines," and incorporated by reference as to its entire contents. (See FIGS. 6F1 and 6F2 which are duplicated in prior art FIG. 1 of the present application). According to inventor, Kyung Soo Han, the depicted Han's Principle, also having nine steps, applies to a balanced rotary speed system also having three variables (like Pascal): Power equals torque multiplied by speed per steps 1, 2 ($P=\tau\omega$). If torque $\tau$ is constant, per step 3, then, a speed and torque mechanically balanced system results such that a power $P_1$, large input power, (for example, a mechanical power $P_1$ received as a wind or water flow by a harnessing module of renewable electric energy) is received by an input shaft meshed with a known prior art "hummingbird speed converter" (discussed in greater detail herein) which may comprise first and second spur gear assemblies or first and second ring gear assemblies driven by the mechanical input $P_1$ from an input motor (not shown) powered by a renewable energy harnessing module (not shown). A mechanical control power $P_2$ is received from a control motor (not shown) and provides a rotational speed control value from the control motor. An output power level of $P_3$, greater than control power $P_2$, per step 8, is output to a shaft rotating at a rotational speed $\omega_3$ greater than the control rotational speed providing an electrical advantage. $P_3$ is greater than $P_2$ when $\omega_3$ is greater than $\omega_2$, per step 7 and per step 8, P. Control power $P_2$ for applying a mechanical speed control to a spur/helical gear "hummingbird speed converter" comprising first and second spur gear (or first and second ring gear) assemblies creates an electrical advantage such that, if the mechanical rotational speed $P_3$ output power is provided to an electricity generator (not shown), the electrical power output by the generator exceeds the control power $P_2$. If the rotational speed of the output shaft exceeds the rotational speed of a control motor (not shown) driving the control shaft connected to the control motor, then, output power $P_3$ exceeds control power $P_2$, per step 8, and an electrical advantage results such that more electrical power $P_3$ is generated than control power $P_2$ supplied by the control motor (not shown). The input power $P_1$, per step 9, is also a conditional variable meaning that the output $P_3$ has to be greater than the control power $P_2$ and the input power $P_1$ used during the process, just as the amount of input force "F" in a closed hydraulic system (Pascal's Principle, step 9)), is a conditional variable. Yet, per Han's principle, the larger the harnessed input power $P_1$ by a renewable energy harnessing module, the more input power may be converted to grid power (not shown).

A detailed explanation of the principles of operation of a concentric wing turbine (Harnessing Module (Water module) Waterwheel and Generator) 220 as shown in prior art FIGS. 2 and 3, and invention FIGS. 6, 7A, 7C, 7D, 8, 9, 10 and 11 of the present patent application (not to be considered prior art). (Invention FIG. 11 will be briefly introduced below for another form of wind or water renewable energy harnessing module 1105 having a propeller 1112 connected by a shaft to Generator 1114.) In prior art FIG. 2 of the present patent application, the renewable energy harnessing module 220, for example, which may be for harnessing water renewable energy may comprise a waterwheel 204 and generator 208 connected by an unnumbered shaft. "Harnessing Module (labeled 220) (Water Module): Waterwheel and Generator (Power=Voltage×Current." The depicted 204 Waterwheel may be a concentric wing turbine 204 taken from U.S. Pat. No. 10,815,968 entitled "Concentric Wing Turbines), issued Oct. 27, 2020, and incorporated by reference as to its entire contents, and which discusses waterwheel 204 comprising inventive "concentric wings," for harnessing water flow energy as an example of harnessing water flow renewable energy efficiently. If for wind, an alternative component 204 may be a large wind propeller for harnessing renewable wind energy while concentric wings are preferably limited to water renewable energy. In prior art FIGS. 2 and 3 of the present patent application and invention FIGS. 6, 7A, 8, 9, and 10, a known concentric wing type water energy harnessing module are shown in each of these invention figures except invention FIG. 11 which along with FIGS. 6, 7A, 8, 9, and 10 all show mechanical speed converters of which "hummingbird" speed converters of first and second ring gear assemblies. FIGS. 8 and 9 further may comprise as a renewable energy harnessing module, for example, a plurality of concentric wing turbines in the case of FIG. 8 and a plurality of parallel connected propeller driven wind turbines comprising large propeller 904-1 connected by an unnumbered shaft to three fixed overlap generators per FIG. 9 while, per invention FIG. 10, any of a horizontal axis wind speed converter 1019 comprising a large propeller are connected by a shaft driving generator 1021, a vertical axis wind turbine 1022 (no propeller shown), a solar panel 1024, a tidal turbine 1010 (no generator shown) and a wave turbine 1012 (no generator shown) by way of example of wind and water turbines are connected to an electrical junction box 1023. A large propeller is typically used for harnessing wind energy, proportionately larger than that depicted as horizontal-axis wind turbine 1019 but a small propeller 1112 facing into water current or wind flow can be used as seen in invention FIG. 11 as propeller 1112 connected by a shaft to generator 1114 for harnessing, for example, renewable river or wind electric power. In prior patent applications of Kyung Soo Han, a waterwheel having a closable hatch under control of spur gear assemblies was used to regulate the capture of water flow renewable energy. This waterwheel with closable hatch could also be used in rivers, oceans and tides. The concentric wing waterwheel water flow (as is seen, for example, in prior art FIG. 2 of the present patent application as waterwheel 204) is not regulated by a hatch. Also, pitch control for a wind propeller harnessing module is not presently used by Kyung Soo Han for regulating speed of a wind propeller harnessing module but is part of the prior art.

Prior art FIG. 2 of the present patent application also shows a known input motor/generator set 225, 250 for use in delivering electrical power at constant frequency to a grid 260 having a preferably constant (or variable) load. When the grid load 260 exhibits a constant load, the variable renewable energy received from the concentric wing water harnessing module 220 from its mechanical speed is regulated via voltage regulator 235. Sampled variable voltage output of harnessing module 220 is fed forward to and regulated to a control voltage value by voltage regulator 235 which is fed by lead 243 to control motor 240. Most of generated electric power from generator 208 of concentric wing harnessing module 220 is received at input motor 225 by electrical cable 215. Grid 260 may be a micro-grid, a collection of micro-grids or a large regional electrical grid, preferably of constant load. The variable speed input motor 225 receives variable renewable electric energy from the concentric wing harnessing module 220, for example, comprising waterwheel 204 and generator 208, which may be for harnessing water energy from one of a river, tide and ocean. The input motor 225 may be controlled via control motor 240 to provide a constant rotational speed by control motor shaft sun gear 247-1 of control motor shaft 247 and first and second (unnumbered) connecting gears meshing with first ring gear 245-1. Unnumbered first of first and second ring gear speed converter assemblies via output generator shaft 257 provide controlled output voltage and frequency to output generator 250 for grid 260 having a constant load. Input motor 225 has a shaft 249 integrally connected to first and second carrier ring gear "hummingbird" assemblies (unnumbered) connected by first and second unnumbered right sun gears of each of the first and second unnumbered carrier ring gear assemblies and lastly to generator shaft sun gear 257-1 integral to motor shaft 257 to turn output generator 250 assumed to have a constant load 260. A constant load which may not be the case, for example, when grid load varies or caused by so-called brown-outs and black-outs can occur during periods of high grid electricity demand. First ring gear 245-1 meshes with a first and a second unnumbered planetary gear of a first carrier assembly and in turn with an unnumbered right sun gear and connecting gear of the first ring gear 245-1 to a second ring gear 245-2.

The apparatus shown in prior art FIG. 3 shows another concentric wing harnessing module comprising waterwheel 310 and generator 320 (variable electric power output) that outputs electric power via lead 325A to input motor 335 as input motor 335 delivers rotational mechanical power to input motor shaft 352 as well as a sampled output voltage via lead 325C to voltage regulator 330. A single spur/helical gear speed converter 380 is shown in prior art FIG. 3 as a speed converter "kingfisher" 345 connected via input motor shaft 352 to a dual ring gear "hummingbird" speed converter 340.

Prior art FIG. 3 of the present patent application is taken from FIG. 9C of U.S. patent application Ser. No. 17/012,426 filed Sep. 4, 2020, by Kyung Soo Han, but see FIGS. 10A, 10B, 11 and 12 which generally show a feedback value) related U.S. Published Application No. 2021/0180559 of Jun. 17, 2021 and, now, U.S. Pat. No. 11,111,898 (the '898 patent), all incorporated by reference as to their entire contents. Prior art FIG. 3 differs from invention FIGS. 6, 7A, 8, 9, 10 and invention FIG. 11. Invention FIG. 6 (FIG. 6, for example, showing a "hummingbird" and a feedback path from an output generator 650 to a voltage regulator 635), invention FIG. 7A (showing first and second three variable ring gear assemblies and a feedback path from an output generator 750 to a voltage regulator 735), invention FIG. 8 (showing a "hummingbird" and a feedback path from an output generator 850 to a voltage regulator 835 via terminal 851, invention FIG. 9 showing a feedback path to voltage regulator 935, invention FIG. 10 (showing dual first and second ring gears 1045-1, 1045-2), and invention FIG. 11 (showing a generic wind or water power renewable energy harnessing module with a propeller 1112 and generator 1114), showing first and second control motors 1165 and 1170 and showing feedback from output generator 1192. None of invention FIGS. 6, 7A, 8, 9, 10 and 11 are to be considered prior art for introducing them briefly in the Background of the Invention Section of the present patent application.

International Publication No. WO 2020/139863A1, published Jul. 2, 2020, of Kyung Soo Han (prior art) incorporated by reference as to its entire contents comprises a SUMMARY OF THE INVENTION SECTION as follows. "A harnessing module capturing wind and water renewable energy" . . . "may have an input, an output, and a control and may comprise a constant speed control motor. The control motor may convert variable renewable input energy . . . into constant electrical energy at constant frequency. The control motor may provide a constant rotational speed output . . . for generating an electrical advantage at a generator output module of constant frequency (fifty Hertz European or sixty Hertz U.S.), for example, at a desired value of kilowatts of power to a power grid. . . . A proper adjustment gear assembly . . . is from negative one times the variation in rotational speed to positive one-half times the variation in rotational speed of the input . . . . The mathematical logic for an adjustment gear assembly is based on feedback control requirements." "It is suggested herein to measure waterwheel (wind propeller) rotational speeds and delivered torque over a period of a month or more . . . with a generator load (generating module) . . . in order to design a harnessing module, control module, generating module closed system that may balance torque and variable speed sufficient to turn a generator so as to produce a constant value of power so as to produce a constant value of power at an electrical advantage . . . . The harnessed input power of wind or water flow must exceed the sum of applied control power from a control motor and the generated output power. When the output power exceeds the applied control power, there is an electrical advantage."

Invention FIG. 10 of the present patent application (not to be considered prior art) shows any of a horizontal axis wind speed converter to rotational energy in any direction 1019 comprising a large propeller connected by a shaft for driving generator 1021, a vertical axis wind turbine 1022 (no propeller shown), a solar panel 1024, a tidal turbine 1010 (no generator shown) and a wave turbine 1012 (no generator shown) by way of example. A large propeller is typically used for harnessing wind energy, larger than propeller depicted as horizontal-axis wind turbine 1019 but a small propeller 1004-1 facing into water current can be used for harnessing, for example, renewable river electric power of generator 1008-1 of a river turbine. In prior patent applications of Kyung Soo Han, a waterwheel having a closable hatch under control of spur gear assemblies was used to regulate the capture of water flow renewable energy. This waterwheel with closable hatch could also be used in rivers, oceans and tides. The concentric wing waterwheel water flow (as is seen in prior art FIG. 2) is not regulated by a hatch. Also, pitch control for a wind propeller harnessing module is not presently used by Kyung Soo Han for regulating speed of a wind propeller harnessing module but is part of the prior art.

Prior art FIG. 2 of U.S. patent application Ser. No. 17/012,426, filed Sep. 4, 2020, by Kyung Soo Han, now U.S. patent Ser. No. 11/111,898 issued Sep. 7, 2021, incorporated herein by reference as to its entire contents, shows the concept of what may be called a "motor equivalent" generator set (ME-G set) 200. Rather than a constant speed, a "motor equivalent" 210 may receive a variable power or rotational speed due to variations in water speed and direction of flow or wind flow and direction. Solar panels generate renewable energy when there is sun light and no electricity when there is no sun. For example, the motor equivalent 210 may be a land module comprising a "hummingbird" speed converter, an input motor 225 and a control motor 240 and output generator receiving speed or voltage from a water module 220 renewable energy harnessing module such as a waterwheel or propeller (water or air) or a concentric wing energy harnessing module driven by water at variable speed (because air or water are at variable speed and direction) or a solar panel. The "motor equivalent" 210 may comprise a harnessing module coupled with a speed converter to deliver constant speed so that the output of the generator 120 outputs at constant electrical frequency. The "motor equivalent" 210 water module 220 comprising waterwheel 204 and generator 208 converts variable power to a constant rotational speed to generator 120 which outputs electricity at constant frequency such that output power of generator 250 equals voltage times current to grid 260 at constant load. The input motor 225 may be driven by electricity from a land module (not shown, for example, a wind farm or solar panel farm) or a water energy harnessing module 220 (shown). Solar panels (not shown), in other applications, with back-up generator use, may use banks of batteries to run the input motor 225 (which may use direct current) when the sun does not shine at night. Wind farms typically comprise a number of large propeller-driven electricity generators. A principle of a known motor generator set is that the input motor 225 is operated at constant speed to generate constant frequency electric power for a constant grid load 260 shown.

In U.S. Pat. No. 11,111,898, issued Sep. 7, 2021, and entitled "Voltage Converter-Controlled Damless Hydrokinetic River Turbines," (already introduced above), FIG. 9A thereof, shows a land module 900 having a renewable energy harnessing module 905 providing a mechanical rotational input propeller 910 to a dual ring gear "hummingbird" and a spur gear "transgear" assembly via control motor shaft gears 924-1, 924-2 to a control generator 950. A control motor 930 receives a control output 945 from a voltage regulator 935. Voltage regulator 935 receives an output from control generator 950 which is input to the first control motor 930 whose shaft has sun gears 924-1 and 924-2 for mechanical input to the dual ring gear "hummingbird" and the spur gear "transgear." These speed converters deliver controlled output to output generator 975 for outputting constant electricity to variable load 958 and micro-grid 950 when possible. (There is no feedback from FIG. 9A output generator 975 to voltage regulator 935.) An embodiment of FIG. 9B comprises a harnessing module propeller 905 for providing a mechanical rotational input 910 to operate a input generator 912. The input generator 912 provides electric voltage output to run input motor 914 where the electric voltage output is also sampled and the sample fed forward to voltage regulator 935. The output of input motor 914 drives first and second speed converters controlled by control motor 930 to constant speed of output generator 975. Yet another embodiment of FIG. 9C, replaces a mechanical propeller with a harnessing module 905 and generator 907 which provides an electrical input 909 to input motor 974 and fed-forward sample voltage to voltage regulator 935. Otherwise, operation is similar to other embodiments whereby control motor 930 inputs control speed to two speed converters and outputs constant speed to output generator 975 which outputs constant output frequency to variable load 975 when possible (there being no feedback of possible variable voltage to voltage regulator 935). FIG.'s 10D and 12 may be differentiated from the present invention embodiments which provide feedback control as well as feed forward control of an output generator via a voltage regulator.

Prior art FIG. 3 of the present patent application is taken from FIG. 9A of allowed U.S. patent application Ser. No. 17/012,426 filed Sep. 4, 2020 (introduced above), by Kyung Soo Han, now U.S. Published Patent Application No. 2021/0180559, published Jun. 17, 2021, and now U.S. patent Ser. No. 11/111,898 (the '898 patent) issued Sep. 7, 2021, incorporated by reference as to its entire contents. The '898 patent shows a so-called "kingfisher" speed converter 345 in FIG. 3 as the second speed converter to a "hummingbird" speed converter 340 which includes similar FIG. 2 of a motor equivalent generator set and FIG. 10D showing a fed-forward signal to a spur/helical gear assembly ("kingfisher" 1044). The so-called speed converter "kingfisher" (a spur/helical gear assembly 380) may process feedback speed from output generator 390. A first enclosed chamber (left unnumbered enclosed chamber) may contain a "hummingbird" dual ring gear speed converter" 340 and a second enclosed chamber (right) may contain a spur/helical gear assembly 380 or speed converter "kingfisher" 345.

Prior art FIG. 3 of the present patent application shows an example of a concentric wing waterwheel 310 and generator 320 as a water energy harnessing module which could be, equally, a wind flow harnessing module) whose voltage is sampled and delivered to voltage regulator 330 and delivered by lead 382A to variable voltage transformer 385 which may provide an adjustable control voltage via lead 382B to control motor 370. A concentric wing turbine is discussed in U.S. Pat. No. 10,815,968 issued Oct. 27, 2020, to inventor Kyung Soo Han, and already introduced above. In summary, the concept of an input motor 335 is shown that may deliver a desired constant rotational speed by use of gears or a transformer (variable voltage-controlled transformer 385) and a shaft 384. Shaft gear 384-1 meshes with a connecting gear (unnumbered) to a spur gear transgear assembly 380 which in turn connects to a generator 390 via generator shaft 340-1 and shaft gear 340-2, while control motor 370 via shaft 372 and shaft gear 372-1 delivers a desired constant speed to output a desired constant electrical frequency to a micro-grid (grid or variable load, variable speed) 395. A constant speed output of input motor 335 may alternatively be input by mechanical gears (speed converter "kingfisher" 345), a controlled input via lead 382B from a variable voltage transformer 385 and a shaft 340-1 of a generator 390 via feedback which may selectively provide a constant electrical frequency output, for example, 50 Hz, 60 Hz or 400 Hz at a desired voltage.

Solar panels known in the prior art generate renewable energy when there is sun light and no electricity when there is no sun. For example, a motor equivalent generator set used with a solar panel may be a land module comprising a solar panel. The "motor equivalent" may comprise a solar panel renewable electricity harnessing module coupled with a direct current input motor so that the output of the generator outputs direct current or may be converted to constant electrical frequency when the sun is not shining.

Water flows at variable speed and direction (tidal flow, for example) and so does wind. The sun only is bright enough during daytime hours for conversion to electrical energy. An advantage of water flow is the mass/density, inertia or power that may be generated by the flow of water compared with the flow of wind (wind amounts to 6% or renewable energy sources) where wind may be harnessed by large wind-driven propellers or rotor blades. Also, for example, river water typically flows at all hours of the day at a relatively constant rate of flow while wind energy and direction may vary from one minute to the next.

An output generator may comprise per the present invention a variable overlap generator as will be described herein. A variable torque generator is shown in each of U.S. Pat. No. 8,485,933 entitled "Infinitely Variable Motion Control (IVMC) for River Turbines," issued Jul. 13, 2013; U.S. Pat. No. 8,702,552 entitled "Infinitely Variable Motion Control for a Transmission with a Differential," issued Apr. 22, 2014; U.S. Pat. No. 8,986,149 entitled "Infinitely Variable Direction Control," issued Mar. 24, 2015; and U.S. Pat. No. 8,992,370 entitled "Infinitely Variable Pumps and Compressors," issued Mar. 31, 2015 and incorporated by reference into the present application and shown in FIG. 13 of each patent following the principle of moving one of a rotor or a stator so as to overlap one another, be non-overlapping but removed partially from one another and removed from electromagnetic contact with one another. Kyung Soo Han later recognized that the variable torque generator could be a variable power generator. U.S. Pat. No. 9,476,401, issued Oct. 25, 2016, and entitled "Marine Hydrokinetic Turbine" including FIGS. 7 and 8 and 9,490,736, FIGS. 1, 2, 3 and 5, incorporated by reference into the present application explain how a variable torque generator may be a variable power generator. The output power of a generator may be regulated by varying the overlap of rotor and stator. In U.S. Pat. No. 10,378,506, issued Aug. 13, 2019, and entitled "Commutator-less and Brushless Direct Current Generator and Applications for Generating Power to an Electric Power System," in FIGS. 5, 6A, 6B, 6C, 15 and 17, the inventor recognized the use of the rotational speed of the rotor of the generator to determine the relative overlap between rotor and stator for maximum power output and use means for moving rotor and stator to move the rotor with respect to the stator to maximize power output. All of the above patents are incorporated by reference into the present application as support for discussions of the use of such as variable overlap converter in the present invention.

Referring to prior art FIGS. 4A, 4B and 4C, of the present patent application, there are diagrams of a typical dam-based hydroelectric power plant 400 in side cut view. A dam is expensive to build, and worldwide hydroelectric power plants 400 produce approximately 6% of electric energy. A hydroelectric power plant 400 may be considered an example of a motor equivalent generator set (ME-G set). Typically, a river flow stopped by a dam initially provides potential energy as the dam 400 stops river flow and builds a backed-up water reservoir 403 to a selectable depth D between a reservoir 403 and an intake gate 401 (one of many) and its associated penstock 416 which channels the potential energy from the depth D of water back-up into variable kinetic energy as it flows through the dam having built a reservoir 403 to run a turbine generator 419 (prior art FIG. 4B) located in a powerhouse 406 as the water flow achieves different depths D of potential energy of water during rainy (and drought) seasons.

A reservoir 403 may create practically constant potential energy by releasing extra water over spillways providing control of the depth D; (see prior art FIG. 4C showing a view of the dam from the outflow side). A penstock 416 (one of many) of a dam provides a narrow channel for increasing the river's variable kinetic energy from its slow river flow to more constant kinetic energy at higher flow speed. A generator 419 (prior art FIG. 4B) turned by the high-speed water flow as the water flow turns generator 419 with shaft 426 and blades 434. Generator 419 of the dam (there may be several generators across the width of the dam) may receive constant speed controlled by spillways (one of many) for control per prior art FIG. 4C and generates constant frequency for the generated electricity which leaves the generator by long distance power lines 422 (prior art FIG. 4A). River outflow 420 (variable speed by spillway control) continues at the output of the dam.

An expensive hydroelectric dam 400 of prior art FIGS. 4A through 4C may have a plurality of penstocks 416 and generators 419 outputting power to long distance power lines 422 from river flow across the width of the dam 400. Prior art FIG. 4C, for example, shows twenty-six main spillways and sixteen auxiliary spillways. In short, a dam 400 blocks normal river flow by building a reservoir 403. The river flow water is fed through penstocks 416 to turbines/generators 419 which turn the generator shaft 426 connected to rotor 428 and generating electricity with stator 425. The size of a generator/turbine 419 in prior art FIG. 4B can be compared with a little man near rotor blades 434. A generator/turbine 419 has a rotor 428 and a stator 425 where the rotor 428 is turned by a turbine generator shaft 426. The river flow shown by arrow 429 turns rotor blades 434 which turn shaft 426 to generate electricity. The river 420 continues to outflow continuously from the dam 400 except, for example, in drought conditions. A hydroelectric dam 400 is an example of a variable river speed "motor equivalent" generator set (ME-G Set).

The Grand Coulee dam, Hoover dam and the Tennessee Valley Authority are exemplary of projects started in the early $20^{th}$ century in the United States for generating hydroelectric power, but these require large dams to build potential energy for turning electric turbine generators. Prior art FIG. 4C shows the generation of a baseload minimum electricity. Referring to prior art FIG. 4C, another example of a hydroelectric power plant is the Supong dam on the Yalu river bordering China and North Korea. An algorithm of a hydro power plant demonstrating three variable control is that river energy=a minimum value X+Δ, a variable value depending on the water flow speed of the river stopped by the dam through turbines. The spillway-controlled power to a turbine/generator=the reservoir 403 potential energy+the spillways (control) or (X+Δ)−Δ=X, the minimum power generated. The Supong dam boasts twenty-six main sluice gates and sixteen auxiliary sluice gates with an installed capacity of 765 megawatts. (1) Input water flow through each penstock at depth D (2) determines potential energy which is converted to kinetic energy by generator turbines (3) create hydrokinetic power, and (4) output is a continuation of water outflow of the Yalu River. Large hydroelectric generators in such dams on rivers in the United States are now being replaced with more efficient and larger capacity turbines and generators. But the number and utility of dam-based hydroelectric power is limited, and the dams block migrating fish and commercial river traffic on navigable rivers. The dam backs up a river to form a lake which can take away valuable land resources that could be used to grow food or permit animals to feed. On the other hand, the created lake provides water control and recreational use for boating, fishing and the like.

Prior art FIG. 5B shows data collected at the Lee Ranch including wind speed, frequency in hours (1) and energy (3). Prior art FIG. 5A shows harnessing strategy of usable power (2) or wind speed from cut-in speed to rated speed in Ranges I and II. Prior art FIG. 5B shows (3) that wind energy equals wind frequency (1) times (multiplied by) usable power (2). Power harnessed in Ranges I and II which is variable over time is shown by (4) when the graph of prior art FIG. 5A reaches rated power of a turbine. A significant amount of wind energy is shown in Ranges I and II indicated as (5) in prior art FIG. 5B. A constant rated power is shown in (6) Range III of prior art FIG. 5C.

Referring now to prior art FIG. 5C (repeat of FIG. 5A), and prior art FIGS. 5D, 5E and 5F. Prior art FIG. 5C being the same figure as FIG. 5A is prior art. Prior art FIG. 5D represents tip speed ratio (TSR) for a given wind turbine. TSR is defined as the ratio between the tangential speed of the tip of a wind propeller blade and the actual speed of the wind, velocity "v". The tip speed is related to efficiency with the optimum TSR, for example, at a Power coefficient at 0.4 and TSR of seven varies with blade design. Prior art FIG. 5E shows, for example, that faster rotor rotational speed in revolutions per minute (rpm) is producing higher power but, on the other hand, the optimum usable power is related to the power coefficient or related to TSR. Referring to prior art FIG. 5F, note the comment to switch-over to another pole number of a generator so that rated power is not limited. Also notice that velocity v in the equation for usable wind power is raised to the third power per prior art FIG. 5F. A problem is that rated, cut-out power need not remain constant but may be increased, for example, by switching in generators or adding poles. See invention FIGS. 6, 7A, 7C, 7D, 8, 9, 10 and 11 wherein output generators may comprise variable overlap generators (VOG's) per invention FIGS. 7C and 7D on land to add more power generation to the water embodiment (wind suggested but not shown) of invention FIG. 7A, 7C, 7D (which suggest adding a variable overlap generator, increasing poles, adding generators in series that may be switched in invention FIGS. 7C and 7D). When the input speed of input motor 725 is increased, more output generation is preferred. For example, by increasing the load 765 to micro-grid 760 and adjusting the control motor 740 speed, or by using a variable overlap generator or increasing the number of poles of the output generator 750 having typically three or multiple sets of poles added either radially or axially (invention FIGS. 7C and 7D) or other renewable energy harnessing module per invention FIGS. 10 and 11. Also, an output variable overlap generator per invention FIGS. 7C and 7D with a predetermined number of poles may switchably actuate one or a selected number of generator poles, not presently used, to increase generator rated power. This means, for example, in a wind turbine, there may be a lower cut-in speed of a wind propeller and a higher cut-out speed. There is also an option to provide a selectable number of generator poles or connect generators in series to boost power generation using the variable overlap generator of FIGS. 7C and 7D.

Known marine hydrokinetic (MHK) turbines such as run-of-the-river, tidal, ocean and hydrokinetic river turbines and wind turbines have some problems. There is the problem of having to convert a harnessed variable power (water or wind) to a constant frequency and dependable power output. On the other hand, there are many advantages for harnessing marine hydrokinetic (MHK) over wind energy: for example, the density (mass or inertia) of water is much greater than that of wind. Water flow speed is not as variable as wind speed especially when a river constantly flows in the same flow direction (such as the Mississippi River of the United States). Tides are reversible (high tide to low tide flowing toward the ocean and low tide to high tide flowing in from the ocean). Associated known tidal turbines may be limited to generating power in one direction of water flow (during changing high to low tide or low to high tide) and generate maximum power at only two high and low tide changes during a day and so resultant output power is sinusoidal in nature (water flowing in until a maximum speed is reached and then reversing and flowing out until a maximum speed is reached).

Historically, water and wind renewable energy has relied on one of the many variables in order to produce electric energy at constant electrical frequency. A problem in the prior art is that an emphasis has been placed on control by rotational speed (harnessing module and generator output), torque (applied by river/water flow or to a generator shaft), frequency (electrical frequency) and input and output power. A problem with reliance on these variables is that voltage and voltage regulation is overlooked or ignored as a key factor at input from a renewable energy harnessing module to be applied to a variable load and grid.

Consequently, there remains a need in the art to provide applications of an energy conserving harnessing module, at least one speed converter and a power generating module for a hydrokinetic or wind turbine to provide a variable value of fed-forward power and feedback power at variable frequency to a voltage regulator which receives both feed-forward voltage from a harnessing module and feedback voltage from a variable load of a grid via, for example, one or both of first and second ring gear assemblies per invention FIGS. 6, 7A, 8, 9 and 10 and first and second spur/helical gear assemblies connected above and below on control motor 1170 shaft 1172-2 as seen in invention FIG. 11.

SUMMARY OF THE PREFERRED EMBODIMENTS

Embodiments of control systems for renewable energy electric power generation at constant frequency may involve the combination of first and second spur/helical gear assemblies called spur or helical gear assemblies such as a dual spur gear or a dual ring gear speed converter gear assembly having a voltage input from a wind/water energy harnessing module that is fed to both an input motor and a voltage regulator, for example, FIG. 7A, input motor 725 and voltage regulator 735. See invention FIGS. 6, 7A, 8, 9, 10 and 11 for embodiments of a preferred dual ring gear speed converter of the present invention controlled by voltage and speed and with feed forward from an energy harnessing module and feedback from a variable load. Speed, for example, of the generator 608 (FIG. 6) can control voltage at feed forward terminal 641 and voltage output by the generator 608 of harnessing module (wind or water) 620 can control rotational speed of input motor 625 in revolutions per minute. Not all dual ring gear speed converter assemblies shown in invention FIGS. 6, 7A, 8, 9, 10 and 11 may be replaced by dual spur/helical speed converters. The voltage regulator 635 of invention FIG. 6 thus may receive a variable fed-forward value of voltage output from the wind/water energy harnessing module 620 (or multiple wind/water harnessing modules) via feed forward terminal 641. In addition, the voltage regulator 635 of invention FIG. 6 may receive a feedback variable generated voltage value output to a variable load 665 via feedback terminal 651, the output voltage of generator 650. The voltage regulator 635 may then provide a control output voltage via lead 643 to control motor 640 for controlling the dual ring gear speed converter assembly whose output mechanical rotational speed turns a generator shaft 657 for renewable electric energy delivery to a variable load 665, variable micro-grid 660 load or regional grid (not shown) whose load may vary. While a dual ring gear "hummingbird speed converter" is shown, a dual spur/helical gear speed converter may also be used in a similar manner to compare voltages rather than mechanical speeds of prior art speed converter systems. The "hummingbird" speed converter control has a control motor 640 whose output is determined by the voltage regulator 635. The "hummingbird" speed converter converts variable rotational speed input of generator shaft 657 of output generator 650 to constant electrical frequency and the voltage regulator 635 automatically adapts to variable renewable electric voltage input from a harnessing module 620 and to variable generated voltage feedback from the variable load 665 of a grid 660. A water flow power harnessing module 620 may be a waterwheel, paddle wheel, concentric rotating wing harnessing module or other module designed to harness energy and in particular, balancing voltage as opposed to torque $\tau$, rotational speed $\omega$ at an approximately constant rotational speed or $\omega$ to generate or of renewable energy or power. It is a principle of the present invention that $\tau$ (Harnessing Module)=>$\tau$ (Controlling Module)+$\tau$ (Generating Module) since some $\Delta\tau$ (Harnessing Module torque) or $\Delta\omega$ (Harnessing Module change in speed) shall be released or eliminated if the water/wind speed and generated torque for driving the controlling and generating modules may be released to achieve a constant, for example, fifty kilowatt output or higher output to an electric power grid or distributed locally.

Wind or water velocity can impact renewable energy by a power of three or $v^3$. It is important to not be limited to a baseload power limitation dictated by the rated power of an output generator. An output generator may operate at a baseload power, rather than at 25 kilowatts but, for example, at a variable value such as 200 kilowatts by adding poles or generators; see invention FIGS. 7C, 7D and invention FIG. 10. In other words, the rated power may be increased when a first baseload value is exceeded by increased harnessed wind, water and/or solar renewable energy power.

A further principle of the present invention is that of achieving constant torque in a balanced three variable system (input, output and control) such that $\tau$=Energy/$\omega$ where $\omega$ is rotational speed of output. Energy may be generated electrical power at a baseline/baseload level at a constant frequency. By balancing torque T and speed $\omega$ and regulated by voltage in a closed or three variable "hummingbird speed converter" control system, one may be able to use a constant rotational speed control motor utilizing only about a tenth of the harnessed water flow energy (a relatively small control energy input compared with the energy that is harnessed or generated) to generate a constant, for example, fifty kilowatts of renewable energy. That is, depending on the water flow input and the torque it exerts on a harnessing module, a base-line value of electrical energy may be achieved that is available as electric power output so long as output power exceeds control power.

In one embodiment, to reduce a requirement for generating power to run a constant speed generator at, at least, a constant base-line power, a conventional direct current generator or an AC generator (turned by the harnessing module) or an existing power grid may be used for power to run a constant speed control motor. An embodiment of a power collection module on land may be powered by storage batteries storing excess generated DC power. U.S. patent application Ser. No. 15/707,138 filed Sep. 18, 2017, now U.S. Pat. No. 10,378,506 issued Aug. 13, 2019 (prior art), discussed above and incorporated by reference as to its entire subject matter, suggests a commutator-less and brushless direct current generator that is more efficient than known DC generators and may be used in the present invention to generate direct current power for a control motor or a control motor may operate with alternating current. For example, for a solar panel, the input motor 625 may be a direct current input motor Invention FIG. 7A shows how more electric power generation is possible with the "hummingbird" speed converter of invention FIG. 6. When the input water/wind speed is increased and more electric power generation is preferred, for example, for increasing the variable load 765 or the capacity of the micro-grid 760, one may adjust the speed of control motor 740, use a variable overlap generator (VOG) in place of generator 750, switch in poles of a generator (per invention FIG. 7C or 7D) or provide generators in series that may be switched in. A variable overlap generator is shown and described by prior art U.S. Pat. No. 9,476,401, issued Oct. 25, 2016, for a "Marine Hydrokinetic Turbine," per FIGS. 7, 8A, 8B and 8C, incorporated by reference as to its entire contents and already discussed in some detail above.

Invention FIG. 11 introduces the use of first and second control motors 1165 and 1170 to control the output of output generator 1190 compared with invention FIG. 7A. FIG. 7 shows one control motor 740 and one output dual ring gear speed converter 745-2 (no spur/helical gear assembly) controlling the output frequency to a constant frequency at a baseload voltage to variable load 765 and micro-grid 760. Both the invention of FIG. 11 and the invention of FIG. 7A obtain feedback voltage from output generator 750, 1190, FIG. 11 showing a second control motor 1170 to supplement first control motor 1165. Feed forward voltage to voltage regulator 735, 1130 and feedback voltage from output generator 1190 to voltage regulator 735, 1130.

There remains a need in the art for automatically adaptable voltage and frequency regulation so that baseload power may be increased or decreased depending on wind or water (or solar) harnessing module electric capacity for generating electricity via extended baseload technology and, for example, variable load voltage requirements, for example, are present under mechanical or electrical connection to a land-based control and generating module from a water flow energy harnessing module located in the water or supported by a floating platform or, for wind flow, located on a platform secured, for example, to an ocean bottom or located, as is well known in the art, in a land-based farm of wind flow turbines. There may be feed forward of variable harnessed voltage (according to wind flow and weather conditions) and feedback of variable generated voltage delivered to a via a variable load (for water flow turbines) to a voltage regulator for determining an appropriate control voltage to at least one of two control motors providing a control of delivered constant voltage at constant frequency to a variable load. These and other embodiments will be described with respect to the drawings, a brief description of which follows.

BRIEF DESCRIPTION OF THE DRAWINGS

Prior art

Figure 2:
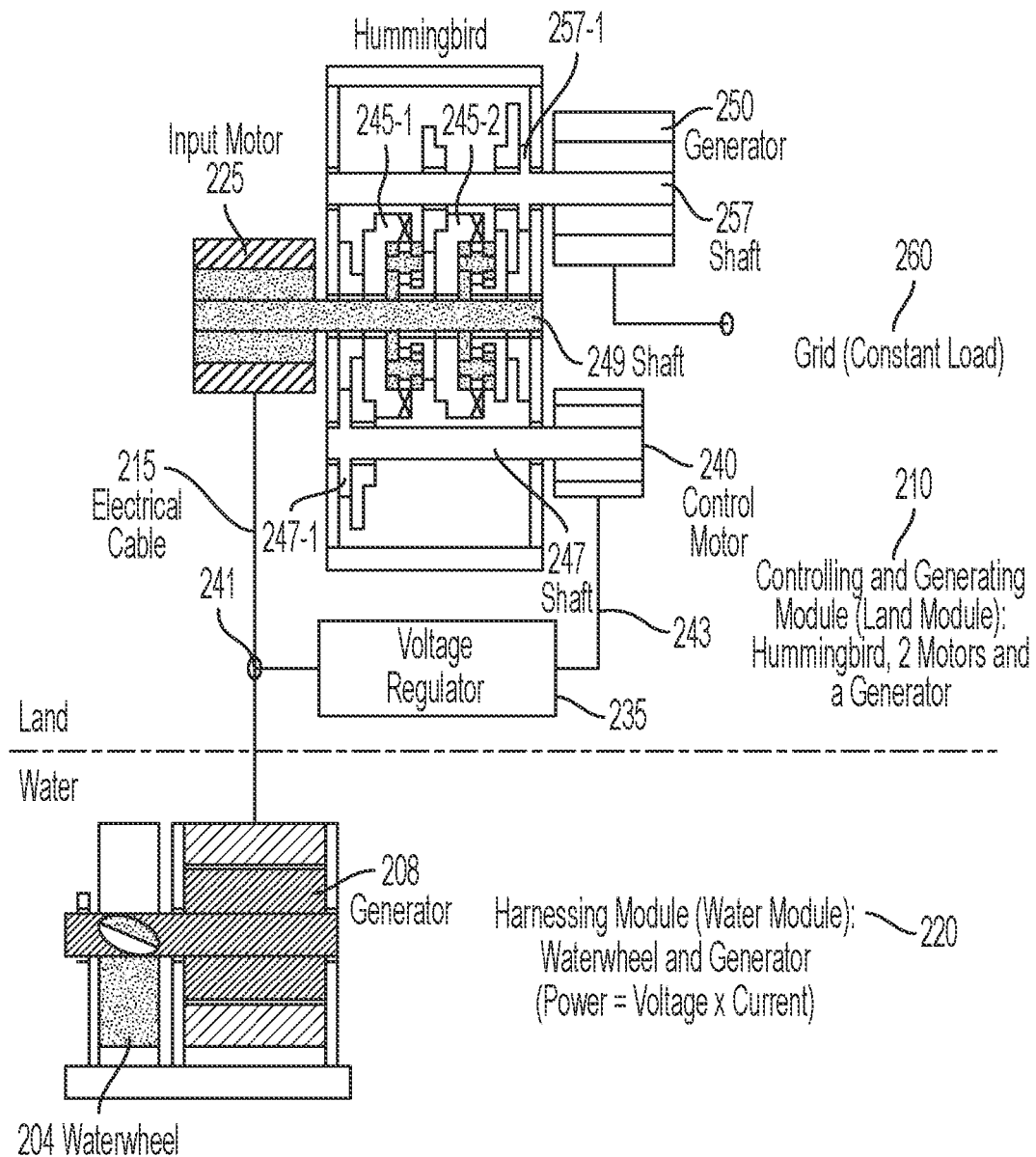

Prior art FIG. 2 comprise a prior art concept of harnessing variable voltage at a wind or water harnessing module that may be located on or in the water and using a voltage regulator for the purpose of delivering variable control voltage to a control motor, for example, using an electrical cable between the water module and a land module comprising a "hummingbird speed converter", an input and a control motor and a baseline electric power generator for powering a constant load.

Figure 3:
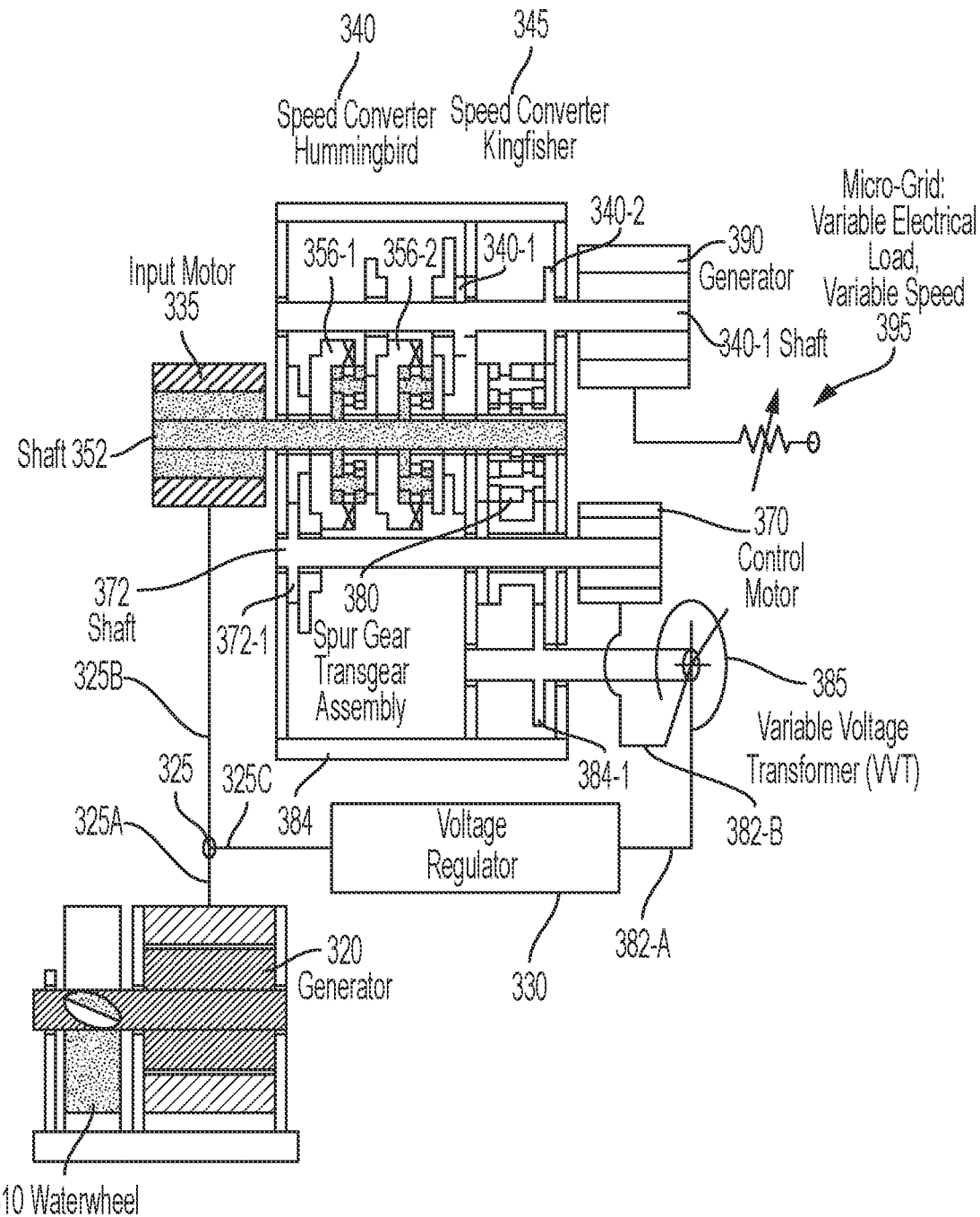

Prior art FIG. 3 shows the use of a "kingfisher" speed converter 345 comprising a spur/helical gear assembly 380 for processing feedback rotational speed of an electric energy generator 390 in addition to using voltage regulator 330 and variable voltage transformer for processing a fedforward variable voltage value output of a wind/water harnessing module 310, 320. Input motor 335 receives most of generated electricity by waterwheel 310 and generator 320 via leads 325A and 325B while lead 325C merely samples the voltage for providing a feed forward voltage to variable voltage transformer 385 via lead 382A.

Figures 4A, 4B:
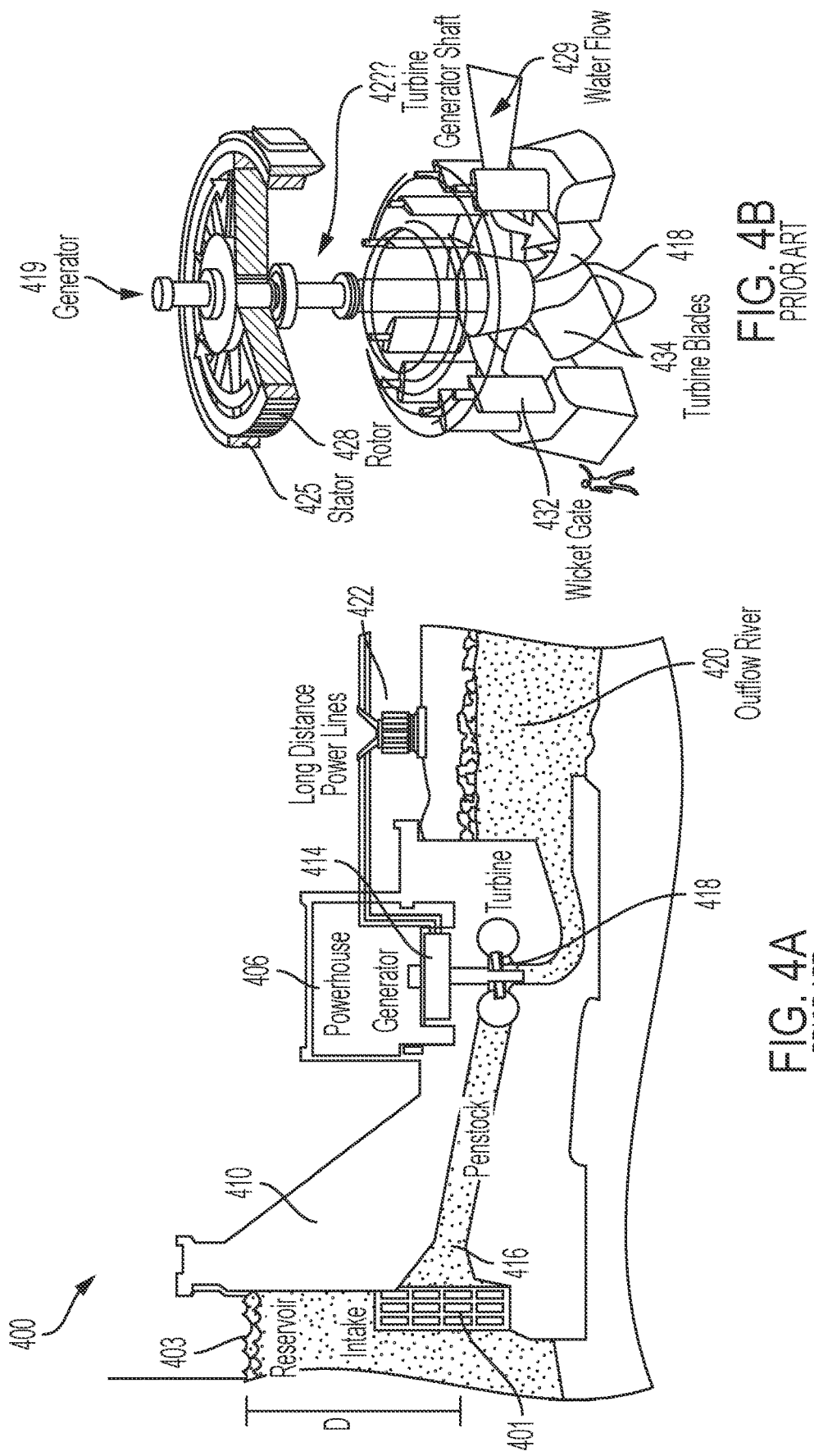

Prior art FIGS. 4A and 4B show an example of a hydroelectric power plant (a dam using a reservoir 403) to generate electricity using a penstock 416 below the water level of reservoir 403 having potential energy that is converted to kinetic energy by one of a plurality of penstocks 416 below. The water flow rushing through penstock 416 delivers practically constant rotational speed for turning a turbine/generator 419 whose shaft 427 turns when water flow 429 turns turbine blades 434 for generating electric power for delivery by long distance power lines 422 to an electric grid. This is an example of a "motor equivalent" generator set (ME-G set).

Figure 4C:
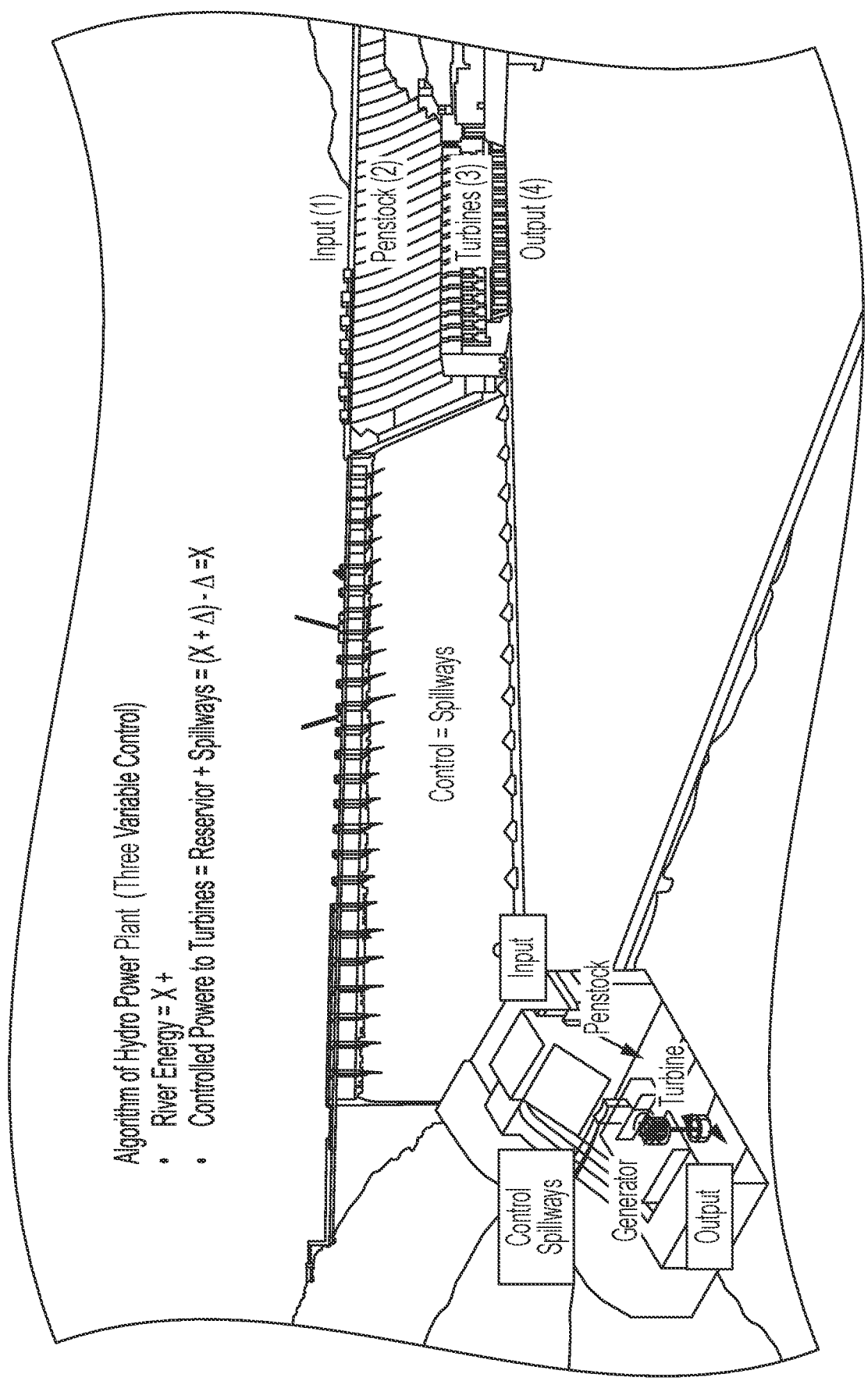

Prior art FIG. 4C shows a view of the Supong dam from the outflow side of the dam located on the border of North Korea and China. Water flow input (1) determines the speed of water flowing through a penstock (2) converting potential energy into kinetic energy which turns a turbine (3) generating hydrokinetic power and provides an electric power output (4) seen in prior art FIG. 4C as a continuation of water flow.

Figure 5A:
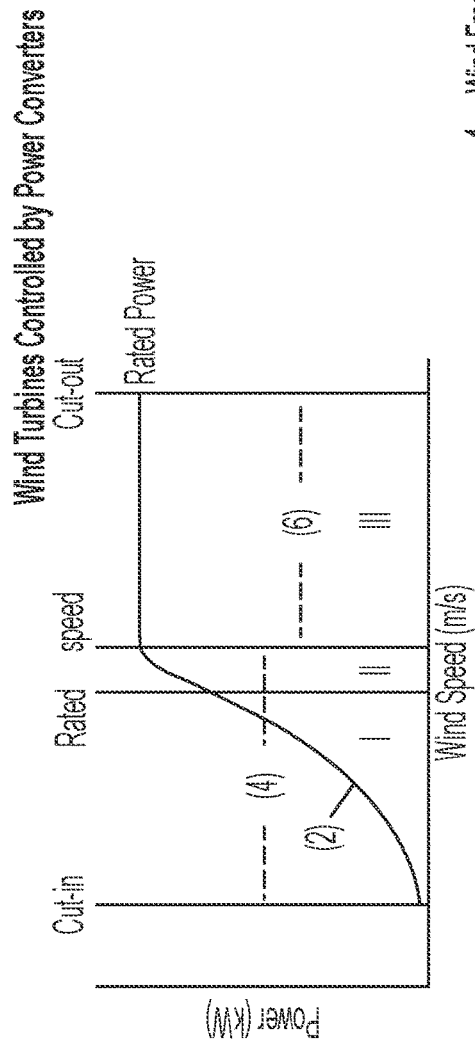
Figure 5B:
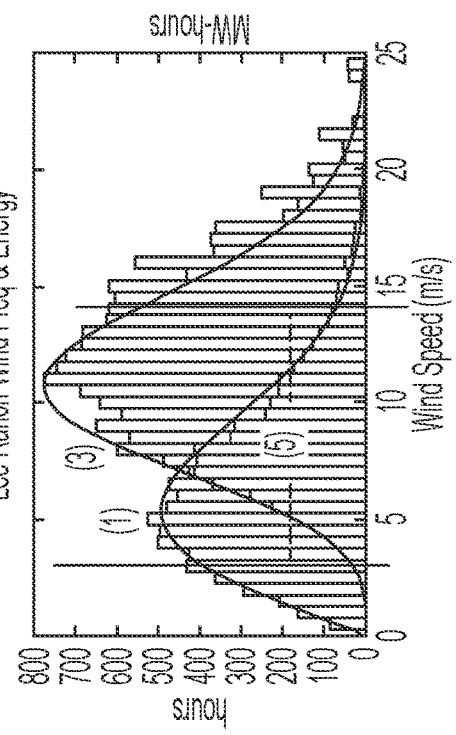

Prior art FIGS. 5A and 5B shows data collected for wind generated power at the Lee Ranch where (1) is wind frequency in hours versus wind speed in meters/sec; (2) is harnessed usable power in graph Range I of prior art FIG. 5A; (3) is a graph of wind energy or (1) wind frequency multiplied by (2) harnessed usable power; (4) is the power harnessed in Ranges I and II of prior art FIG. 5A and is variable until a rated wind speed of, for example, thirteen meters per second is reached; (6) is constant rated power in Range III of prior art FIG. 5A (or prior art FIG. 5C).

Figure 5C:
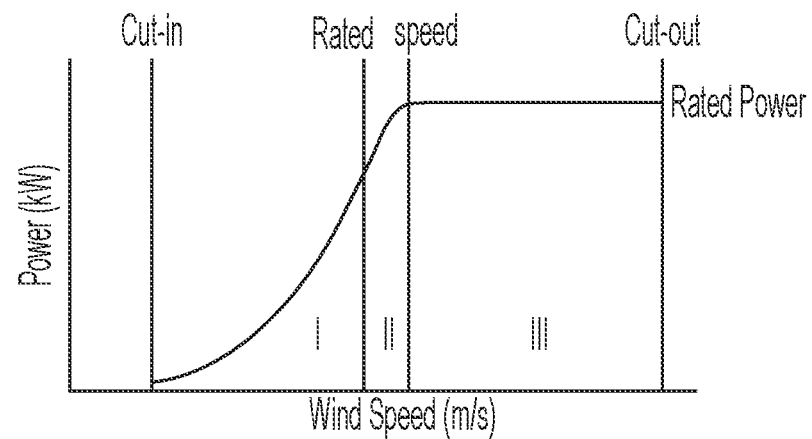
Figure 5D:
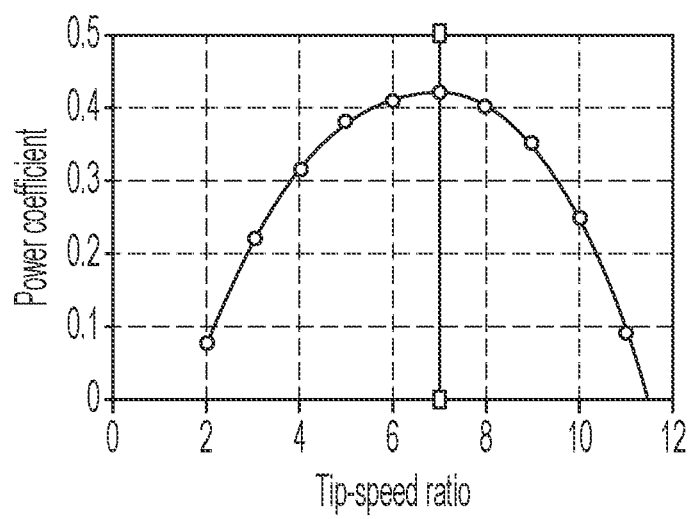
Figure 5E:
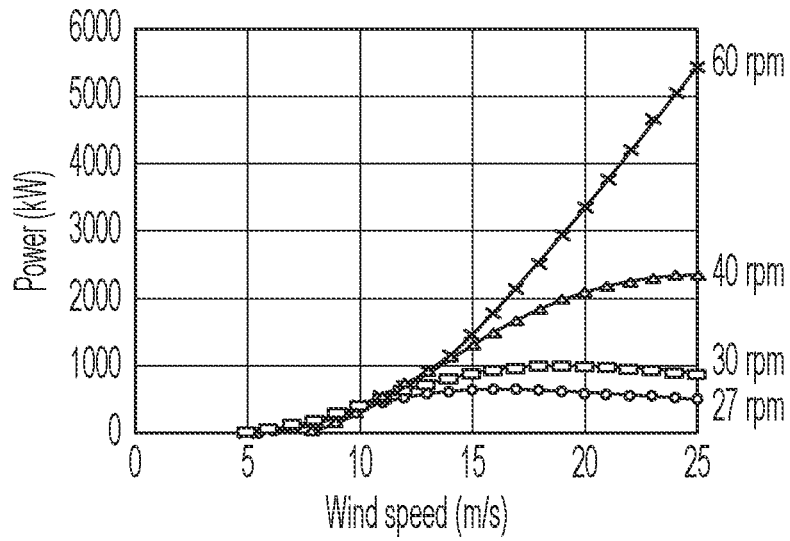
Figure 5F:
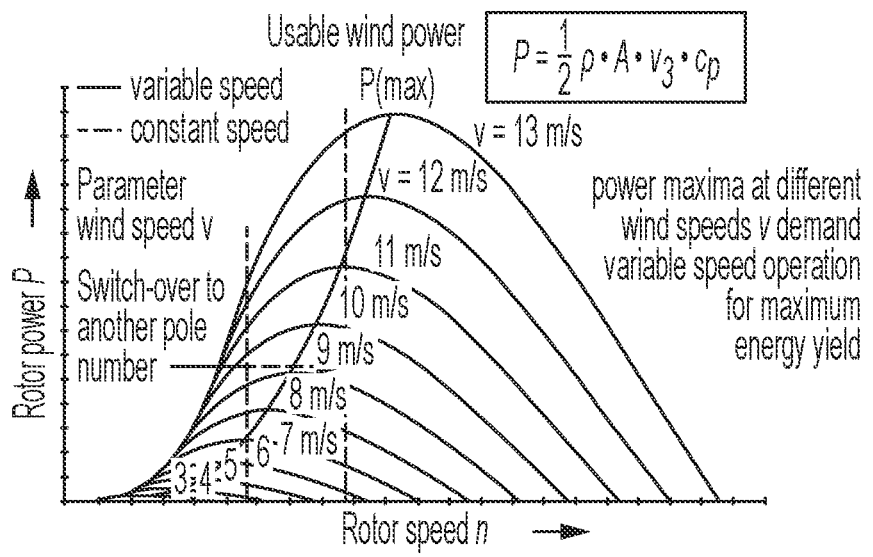

Prior art FIG. 5C and the graphs of prior art FIGS. 5D through 5F show figures where, for example, FIG. 5C is identical to FIGS. 5A and 5B but for indicating in the latter a table for identifying labels (1) through (6). Prior art FIGS. 5D and 5E show the relationship between tip-speed ratio, for example, at a value of nine and power coefficient at its peak, for example, at 0.4 and wind speed versus generated power respectively. It is important to note from prior art FIG. 5E that if the wind speed is twenty-five meters per second, the power generation increases greatly to about five thousand five hundred kilowatts at rotor velocity of sixty revolutions per minute. It is an object of the present invention to not be limited by wind speed, wave generation or water flow. Prior art FIG. 5F exemplifies the equation for usable wind power that wind velocity to the third power suggests switching over to another pole number (wind speed at 9 m/s shown) or adding a generator in series to increase the rated power output of a wind farm. In other words, there should be no limit to generation of power in a wind turbine farm.

Figure 6:
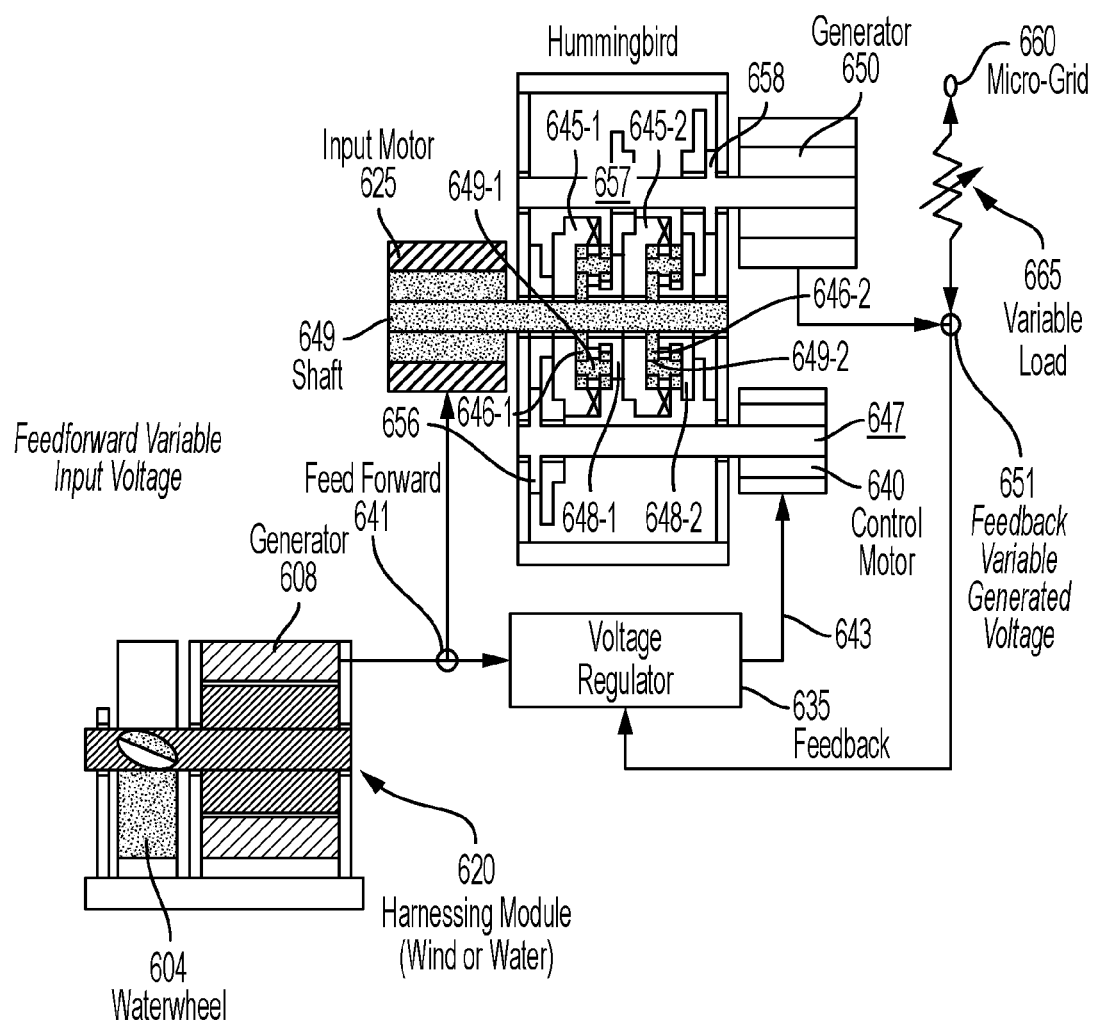

Invention FIG. 6 shows an example of voltage regulation of the present invention using a voltage regulator 635 for regulating voltage to a control motor 640 by monitoring variable harnessing module 620 output electric voltage as a feed forward voltage value input to the voltage regulator 635 and variable voltage delivered to a load 665 as a feedback value to the voltage regulator 635 which compares these values and outputs a control voltage value via lead 643 to a control motor 640. The control motor 640 delivers a control rotational speed to input motor shaft 649 of an input motor 625 having first and second integral or connected (shown) sun gears 646-1, 646-2, so that a constant frequency, constant voltage may be delivered to a variable load 665 via output generator 650. A dual spur/helical or ring transgear gear speed converter may replace a "hummingbird" speed converter of the prior art and be automatically controlled by the value of variable input voltage from the harnessing module 620 (wind or water) and by controlling variable rotational speed of the output generator 650 such that variable output voltage is controlled to constant frequency and maximum baseload voltage of delivered electric power to a variable load 665, the feed forward voltage of the harnessing module 620 and the feedback voltage delivered by the output generator 650 to the voltage regulator 635 and from the voltage regulator 635 to the control motor 640 so that the output generator 650 of the "hummingbird" speed converter (exemplified by dual ring gears 645-1 and 645-2) can deliver constant frequency such as 60 Hz electric power at a maximum baseload voltage to a variable load 665.

Figure 7A:
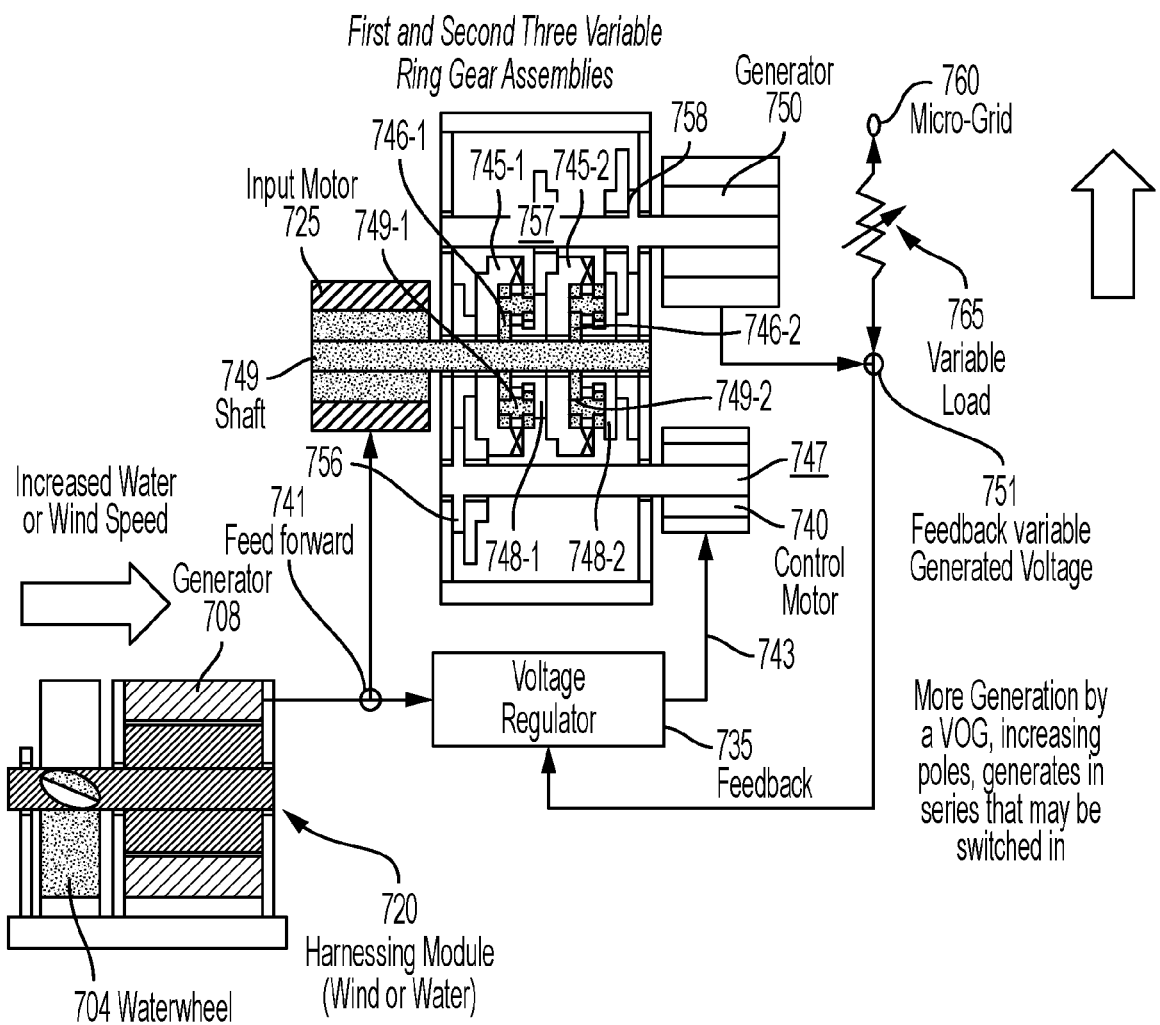
Figure 7C:
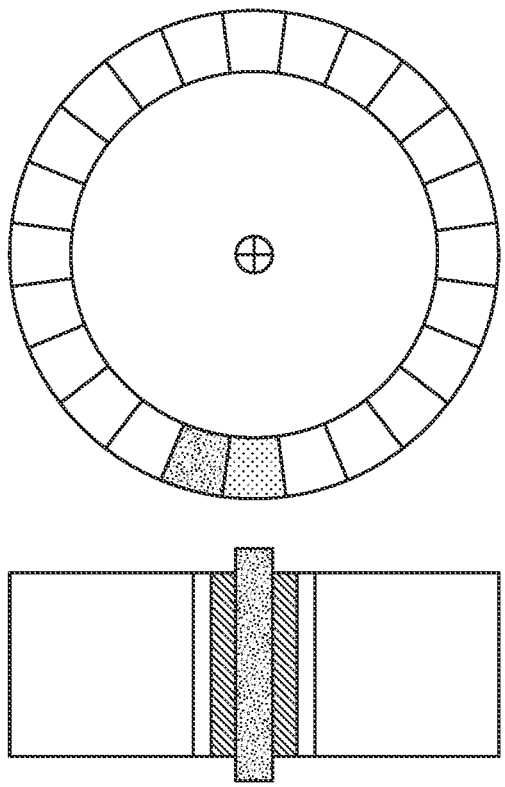
Figure 7D:
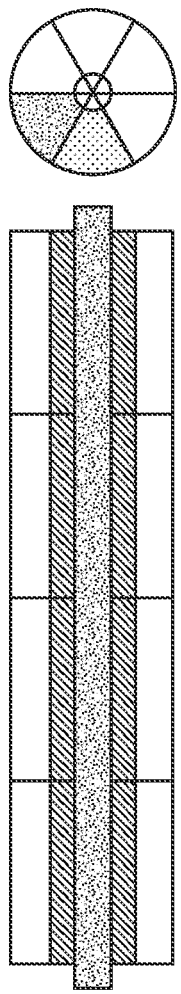

Invention FIG. 7A shows an inventive embodiment of how more electric power may be generated using a voltage regulator 735 controlled system of invention FIG. 6, for example, by using a variable overlap generator, increasing the number of poles axially or radially, and using generators in series that may be switched in (per invention FIGS. 7C and 7D). Generally, a renewable energy harnessing module (water, wind or solar) 720 provides a sample feed-forward variable voltage at variable frequency (governed by the rotational speed of a waterwheel 704 or propeller, not shown) via terminal 741 to the voltage regulator 735 and most of the variable renewable energy voltage is provided by a second branch of terminal 741 to operate an input motor 725 having a shaft 749 comprising first and second integral or connected sun gears 746-1, 746-2. A sample of voltage delivered by output variable overlap generator 750 is fed back to voltage regulator 735 and constant frequency, constant value voltage is delivered to a variable load 765 because of voltage regulator 735 acting in concert with control motor 740. Voltage regulator 735 delivers control voltage via lead 743 to control motor 740 having a shaft 747 having an integral sun gear 756 to first ring gear 745-1 so that a second ring gear 745-2 may output via a second split gear assembly 758 generator shaft 757 integral sun gear 758 for operating output generator 750 at constant frequency and constant voltage to variable load 765. When the input rotational speed increases (for example, increased wind or water flow at a controlled direction) and more power generation for powering variable load 765, more electric power may be generated by output generator 750 at constant frequency such as 60 Hz.

Figure 7B:
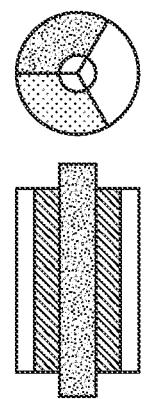

Invention FIGS. 7C and 7D show concepts of generator design where the generator has a fixed number of poles such as a set of three poles per prior art FIG. 7B. An alternative is to provide multiple sets of poles that may be radially added (invention FIG. 7C) to an output generator (not shown) and thus provide a greater rated power for the generator. Alternatively, per invention FIG. 7D multiple sets of poles may be added axially, for example, by connecting a series of output generators together each having multiple sets of poles.

Invention FIGS. 7C and 7D also show how the speed converter of invention FIG. 6 operates where the "input motor" 625 receives the variable voltage value output by a harnessing module 620 as does voltage regulator 635 as a feedforward voltage value. An input motor 725 of invention FIG. 7A may provide a variable rotational speed range between 800 and 1600 rpm. It may be seen that by varying the variable load 765 on a control and generator module that the output frequency of output generator(s) 750 may remain a constant 60 Hz and a value of feedback variable generated voltage by a variable load 765 sampled by voltage regulator 635, 735 to automatically regulate the control voltage provided by lead 643 (lead 743 in invention FIG. 7A) to control motor 740.

Figure 8:
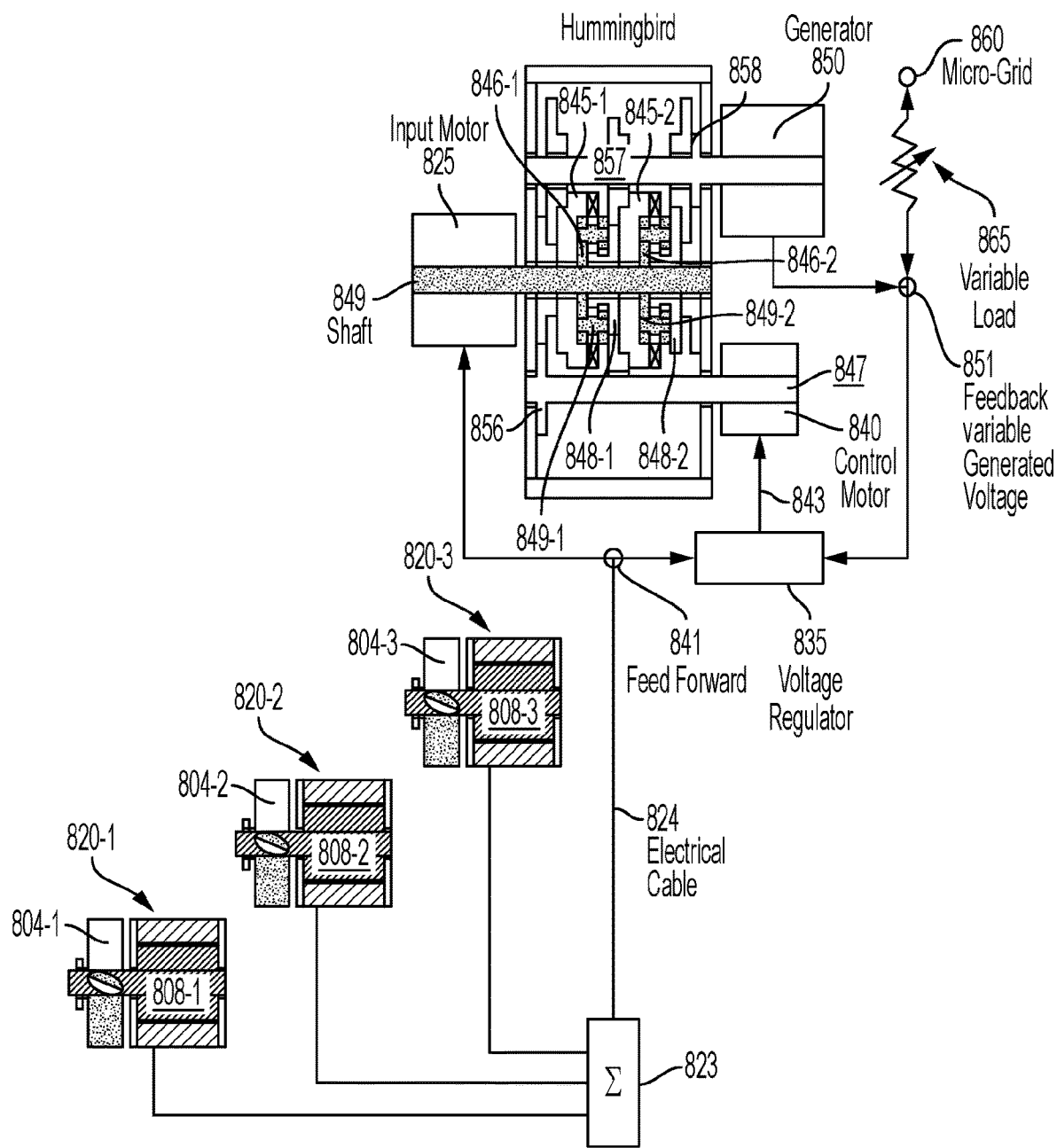

Invention FIG. 8 shows the inventive concept of utilizing a plurality of concentric wing renewable water flow electric energy harnessing modules (concentric wing modules 820-1, 820-2, 820-3 comprising concentric wing components 804-1, 804-2 and 804-3 and generator components 808-1, 808-2, and 808-3 respectively, not limited to three as shown), may be summed at a summation junction electric box 823 and input via terminal 841 at a sample variable voltage value and rotational speed controlled electric frequency to voltage regulator 835 as a feed-forward voltage value for comparison to a variable feedback voltage value to voltage regulator 835 from variable load 865 and variable grid voltage 860 for providing a control voltage value to operate control motor 840 in a similar automatic voltage control manner with feedforward from the concentric wing renewable energy harnessing modules 820-1, 820-2, 820-3 as is shown by the use of a "hummingbird" speed converter assembly as shown in invention FIG. 6 or invention FIG. 7A and feedback from output generator 850.

Figure 9:
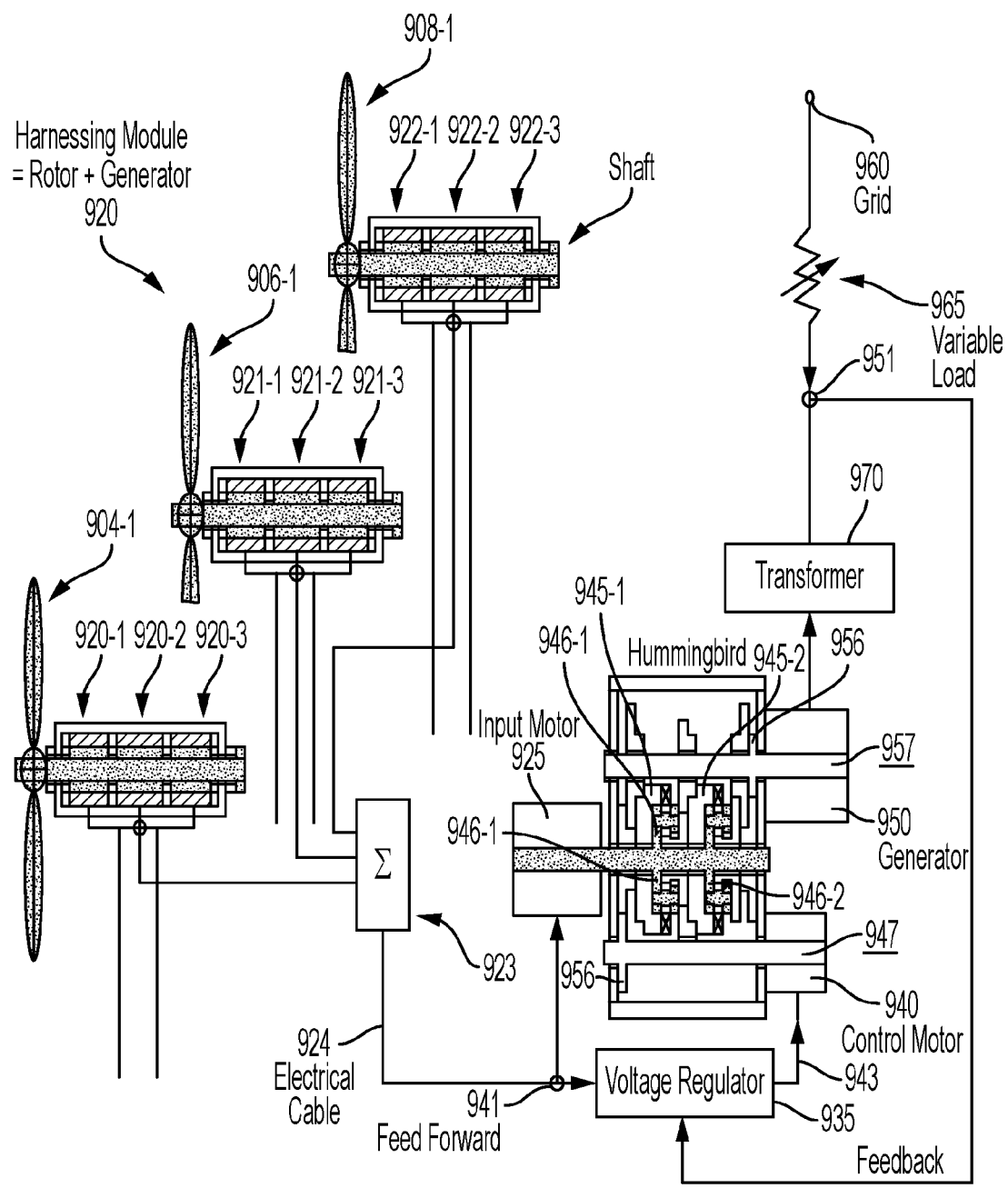

Invention FIG. 9 is intended to show that whether water flow harnessing modules are used as in invention FIG. 8, wind flow (water or solar) harnessing modules 904-1, 906-1, and 908-1 may likewise be used comprising, for example, three or more series-connected generators 920 (FIG. 8 comprising generators 820-1, 820-2, 820-3; FIG. 9 comprising generators 921-1, 921-2, 921-3; 922-1, 922-2, 922-3 and propellers 904-1, 906-1, 908-1 connected to a shaft common to all generators) and connected to provide a variable feedforward electrical voltage value to a voltage regulator 935 via electrical cable 924 and terminal 941. Invention FIG. 9 thus shows an inventive embodiment of a controlling and generating (C&G) module comprising a "hummingbird speed converter" gear assembly of first and second ring gears sharing the same shaft (or first and second spur/helical gear assemblies in an alternative embodiment) referred to herein as a "hummingbird speed converter". Feedback samples of voltage signal from generator 950 transformed by transformer 970 are delivered to voltage regulator 935 and may be provided as seen in FIG. 8 (or as shown in FIG. 9 via output terminal 951 of generator 950, transformer 970). Three wind harnessing modules (shown) and water or solar harnessing modules (not shown in invention FIG. 9 but cables to other harnessing modules are seen) may provide a convenient alternating current voltage value summed at summation junction box 923 and provide a feedforward variable voltage value at frequencies determined by the speed of rotation of propellers 904-1, 906-1, 908-1 to voltage regulator 935. A variable feedforward voltage value may be provided by electrical cable 924 via terminal 941 to voltage regulator 935 and input motor 925 through "hummingbird speed converter" to output generator 950 and via transformer 970 to variable grid load 960. As in invention FIG. 6, the voltage regulator 935 provides a feed forward control voltage value to control motor 940 by comparing the feedforward voltage value and frequency to a feedback voltage value and frequency (not shown) from an output generator for reception by the dual ring gear "hummingbird" speed converter assembly shown to deliver constant output rotational speed to an output generator. The dual ring gear assemblies may be used equally to advantage as dual spur gear speed converters.

Figure 10:
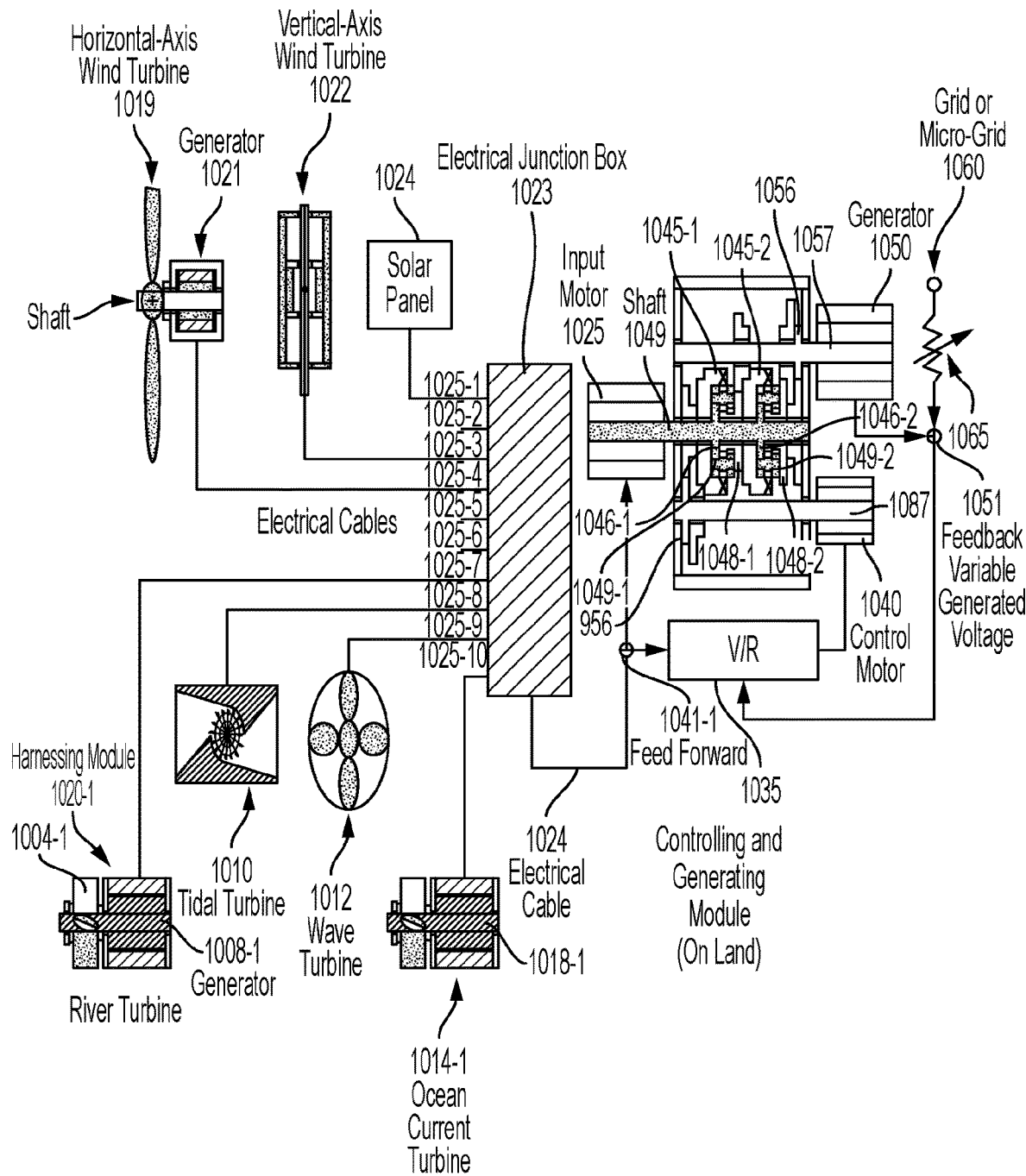

Invention FIG. 10 shows the inventive use of any type of renewable electric energy generator or harnessing module including but not limited to horizontal axis wind turbines 1019, vertical axis wind turbines 1022, ocean current turbines 1014-1, wave electric energy turbines 1012, tidal turbines 1010 and river water turbines 1004-1, 1008-1 of harnessing module 1020-1 as well as solar panel 1024 which may produce direct current. All of these generally provide variable alternating current voltage outputs at variable frequency from direct current to frequencies related to varying rotational speeds of propellers or wave motions and the like to an input motor 1055. Solar panels 1024 generally output varying direct current voltages which may drive a DC input motor (not shown) or the output DC voltage may be converted to varying alternating current voltage as will be discussed in greater detail herein. As in invention FIGS. 6, 7A, 8 and 9, voltage regulator 1035 receives a feedforward variable voltage sample via terminal 1041 and delivers most of voltage gathered by all depicted input devices to input motor 1055. A variable output voltage of output generator 1050 is provided by terminal 1066 to voltage regulator 1035 so that control motor 1085 may provide mechanical control via input motor shaft 1049 to deliver mechanical speed control of output generator 1050 and so provide constant frequency, constant voltage output to a variable load 1065 and grid 1060.

Figure 11:
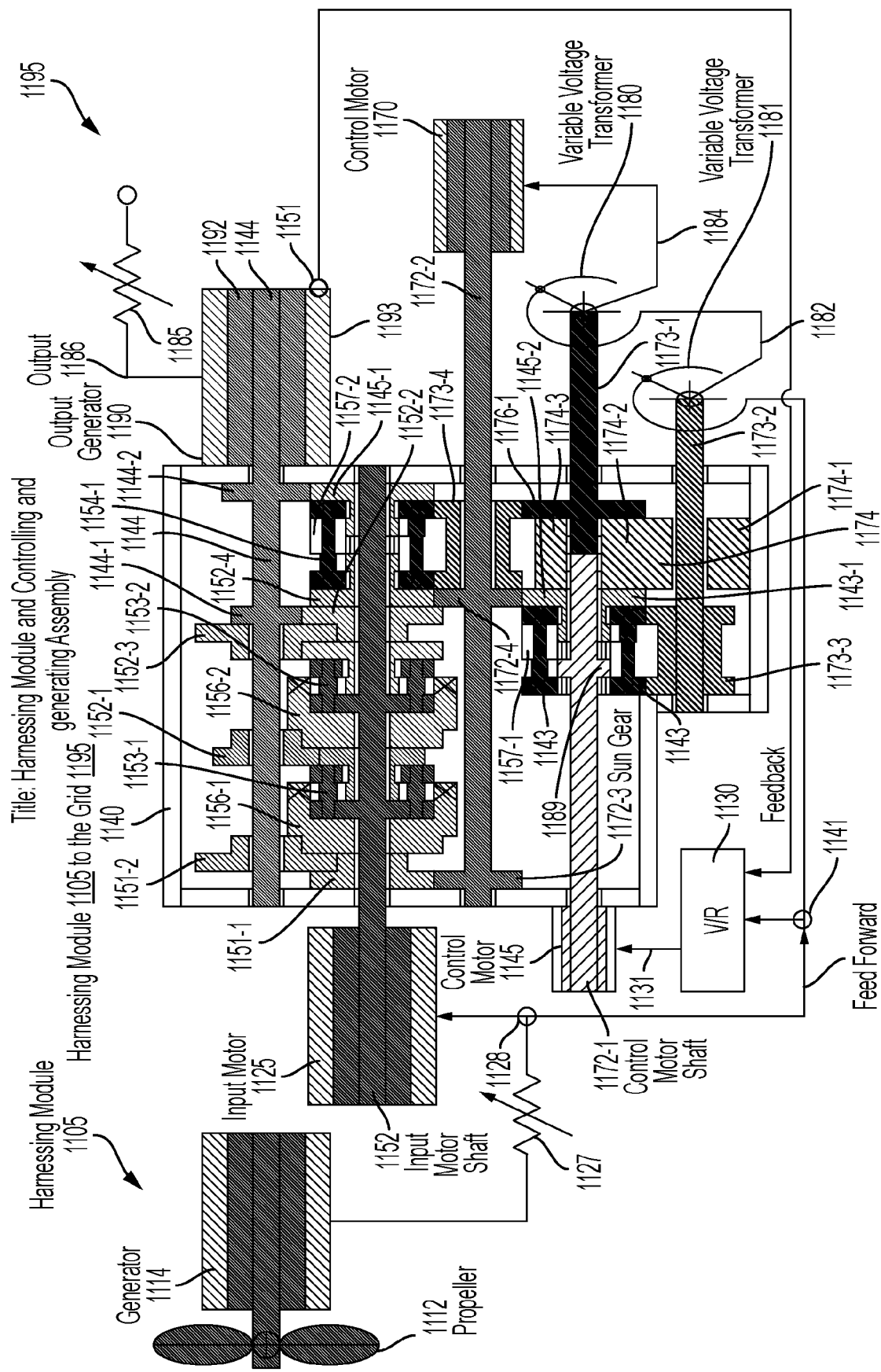

Invention FIG. 11 shows a schematic diagram of a further embodiment of a hydrokinetic turbine of prior art FIGS. 2 and 3 and inventions 6, 7A, 7C, 7D, and 8 through 10. The embodiment of invention FIG. 11 adds further control components to prior art FIG. 3 such as first. control motor 1165 and second control motor 1170 wherein the second control motor 1170 has been added, the second control motor 1170 to supplement the first control motor 1165, first and second variable voltage transformers (VVT's) 1181, 1180 for manually adjusting control voltage at second control motor 1170, first and second ring gear (alternatively, first and second top and bottom planetary gear 1157-2, 1157-1 spur/helical gear (transgear) assembly speed converters or bevel/miter gear Transgear assemblies) 1156-1, 1153-1; 1156-2, 1153-2. FIG. 11 also provides an improved feedback path from output generator 1190 to voltage regulator (V/R) 1130 via terminal 1151 of output generator 1190. FIG. 11 also provides an improved feed forward path from renewable wind or water flow energy harnessing module 1105 via unnumbered electric cable having a variable resistance 1127 that may be controlled by weather conditions such as severe wind and rain conditions measured by meters (not shown) to vary variable resistance 1127 before connecting variable voltage at variable frequency to input motor 1125 via terminal 1128. Output generator comprises a shaft 1144, a rotor 1192 and a stator. The shaft 1144 comprise first sun gear 1144-2 (connected or integral (shown)) connecting to a top planetary gear 1157-2 spur/helical gear assembly having connecting gear 1145-1 to a planetary gear 1157-2 of the first top planetary gear spur/helical gear assembly. The shaft 1144 of output generator 1190 comprises second sun gear 1144-1 connecting by first split gear 1152-1 meshed with second split gear 1152-3 meshed with an unnumbered reverse L shape gear for receiving the output of second ring gear assembly 1156-2. The first and second VVT's 1181, 1180 are used to manually adjust the second control motor's 1170 electrical input via control motor 1170 to its shaft 1172-2. Control motor 1170 comprises shaft 1172-2 having first sun gear 1172-4 (integral shown) connecting to first top planetary gear assembly including planetary gear 1157-2 and to second bottom planetary gear spur-helical gear. assembly including planetary gear 1157-1. Voltage regulator 1130 controls voltage delivered to the first control motor 1165 and responsive to the delivered control voltage adjusts rotational speed of first control motor 1165 shaft 1172-1. As will be further described herein, a shaft support structure 1174 supports shafts of variable voltage transformer 1181 and independently supports both control motor 1165 shaft 1172-1 and variable voltage transformer knob extended shaft 1173-1. Shaft support structure 1174 (1174-1, 1174-2, 1174-3 (in diagonal lines)) surrounds shaft of knob 1182 of VVT 1181 and both shaft 1172-1 of first control motor 1165 and extended shaft 1173-1 of VVT 1180. Planetary gear 1157-1 has an unnumbered meshed sun/sheath/sun gear output rotational speed to the first spur gear transgear assembly 1143 having an output sun/sheath sun gear 1143-1 meshed to the first integral sun gear 1172-4 of second control motor 1170 shaft 1172-4 of second control motor 1170 shaft 1172-2 as well as to sun/sheath/sun gear 1152-4. Variable voltage transformer 1181 shaft 1173-2 obtains sampled input feed forward voltage via terminal 1141 via an unnumbered cable to VVT 1181, via cable 1182 to VVT 1180 and via cable 1184 to control motor 1170. The two series-connected ring gear assemblies 1156-1, 1156-2 have an unnumbered sun/sheath/sun output gear to meshed split gears 1152-3 and 1145-1 which mesh with integral output generator 1190 shaft 1144 sun gear 1144-1 and control motor 1165 shaft 1172-1 integral sun gear 1189 meshes with spur/helical gear assembly 1143 having an unnumbered sun/sheath/sun gear meshing with second control motor 1170 shaft 1172-2 second integral sun gear 1172-4 which meshes with input sun/sheath/sun gear 1152-4 of spur gear transgear assembly 1144-2 which has a control output sun/sheath/sun gear 1145-1 which meshes as a control rotational speed input with second integral sun gear 1144-2 of output electricity generator 1192 shaft 1144. First control motor 1165 shaft 1172-1 supported by shaft support structure assembly 1174 shaft 1173-2 has integral sun gear 1189 which directly meshes with a gear of first spur gear transgear assembly 1143 and so meshes with the output sun/sheath/sun gear 1143-1 which meshes with integral sun gear 1172-4 of second control motor 1170 shaft 1172-2. Thus, integral sun gear 1172-4 is coupled to both the first and second control motor shaft 1172-1, and variable voltage transformer 1181 knob shaft 1173-2. Input motor 1125 shaft 1152 has first and second integral sun gears of ring gear assemblies 1153-1 and 1144-1, the latter meshing via split gears 1152-3, 1152-1 with sun gear 1151-1 meshing with first integral sun gear 1144-1 so that the dual ring gear assemblies 1156-1 and 1156-2 share the feature of providing input variable rotational speed input of input motor 1125 shaft 1152 to first integral sun gear 1144-1 of output generator 1190 shaft 1144. The dual ring gear speed converters comprising first and second ring gears 1156-1, 1156-2 are supplemented with the series-connected spur/helical gear assembly 1145 connected to generator shaft 1144 of output generator 1190 by unnumbered output sun/sheath/sun gear to an unnumbered sun gear of output generator shaft 1144 of housing 1140 proximate to output generator 1190 outside housing 1140. Thus, FIG. 11 described a dual control motor control of both feedback from output generator 1190 and feed forward control of variable voltage at variable frequency of renewable water flow or wind flow energy harnessing module 1105 as well as dual ring gear assembly of input motor 1125 having dual ring gear assembly input to output generator 1190 shaft 144 first sun gear 1144-1.

These and other features of the embodiments of the present invention will be described in the detailed description of the invention and depicted in the accompanying drawings.

DETAILED DESCRIPTION

Figure 1:
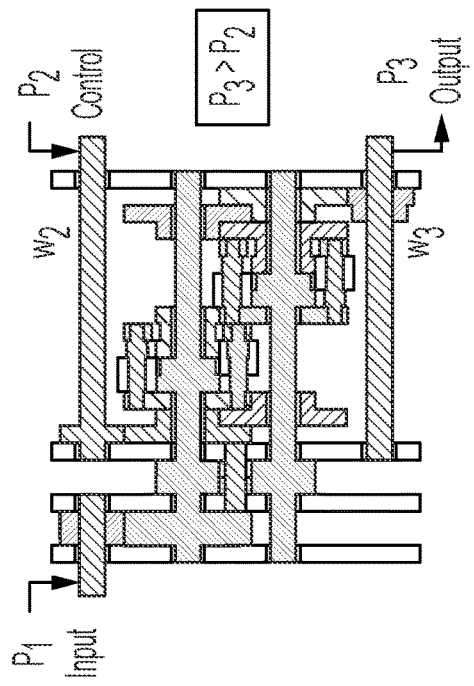
FIG. 1 shows a comparison of Pascal's Principle for a closed hydraulic system and inventor (Kyung Soo Han) Key Han's Principle of a balanced rotary speed system.
Figure 1:
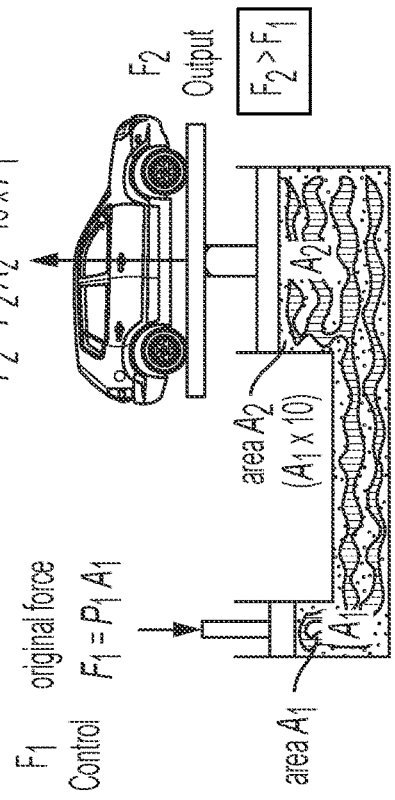

In the figures of the present embodiments of the prior art and invention figures comprising FIGS. 1 through 11, an effort has been made to follow a convention such that the first reference number for a drawing component such as 1XX indicates a figure number as the first digit where the element first appears, for example FIG. 1; for another example, Input Motor 225 and Generator 250 first appear in prior art FIG. 2. Since prior art FIG. 3 differs from prior art FIG. 2, the input motor may be differently referenced as input motor 335. The Hummingbird speed converter of invention FIG. 6 and the voltage regulator 635 share the same last two digits of each three-digit reference numeral with the speed converters of invention FIGS. 7A, 8, 9, 10 and 11.

FIGS. 1, 2, 3, 4A, 4B, 4C, 5A, 5B, 5C, 5D, 5E and 5F refer to the prior art while FIGS. 6, 7A, 8, 9, 10 and 11 provide inventive examples of embodiments demonstrating the use of mechanical and electrical connections among renewable energy harnessing modules (solar, wind and water), control modules and generator modules as well as the introduction of electrical connections to a land module connected by flexible electrical cable to a land module combinations of a voltage regulator, an input motor, no spur/helical speed converters (or one or two such speed converters) and always series-connected dual ring gear speed converters (which alternatively comprises spur/helical or bevel/miter speed converters), first and possible second control motors and additional embodiments of combinations of harnessing modules, housings for wind and water embodiments, land modules and uses with other forms of renewable and engine powered three variable control land modules to demonstrate the inventive concept of using a single voltage regulator to compare variable voltage values received from different types of harnessing modules with different renewable electric voltage energy values as feedforward values and different variable load voltage values for delivery to a grid for comparison to automatically output a control motor rotational speed value output of a voltage regulator that does not limit the capacity of harnessing modules but solves variable load conditions through feedback (for example, during the heat of the summer when there may be brown-outs or blackouts or reduced output capacity of generating modules for delivering electric power to grids). Invention FIGS. 6, 7A, 8, 9, 10 and 11 all exhibit feedforward from a renewable energy harnessing module and feedback from an output generator to a voltage regulator for regulating control voltage for operating first (and in invention FIG. 11) a second control motor.

Referring to prior art FIG. 1 and taking advantage of the usable wind power equation for input power $P_1$ to output power $P_3$ via control power $P_2$ of a wind turbine which increases to the third power of wind velocity and allowing a river, tidal, wave and ocean current to be used when its water flow rate or wave height during stormy seas reach a maximum as well, the present invention suggests using feedforward from a harnessing module and feedback from a variable load to regulate the control power delivered to a voltage regulator so that an optimum power level may be reached which may be a baseload constant power value.

Referring to invention FIG. 6, the concept of a speed converter being controlled by voltage rather than by speed or a wave height of a variable value, or a tide that may change from high to low tide or a solar panel that may output direct current electricity only when the sun shines (see also invention FIG. 10) is suggested for feedforward from at least one renewable energy harnessing module (solar, wind or water) 620 (a waterwheel 604 and generator for water shown) supplying power via a dual ring gear speed converter (or optional dual spur/helical speed converter) to a variable load 665 and grid 660. Speed of rotation of a harnessing module or a generator can control variable voltage and frequency output of at least one renewable harnessing module 620 and one output generator 650 to a variable load can control output generator speed (and output frequency) and generated voltage to a baseline constant load (that may vary with the type of energy gathered and when it is present). Invention FIG. 6 introduces the present invention from the use of a concentric wing waterwheel 604 running a generator 608 as a river turbine (which may also be a wind turbine or even a solar panel) for not just generating a baseline value of renewable electric energy but a maximum value of electric energy during, for example, high wind or high water flow conditions. In particular, harnessing module 620 may harness wind, water or solar electric energy and output an optimum value of electric voltage to terminal 641. One branch of terminal 641 feeds forward the harnessed value of variable electric voltage to an input motor 625 for a speed converter (for example for sun or wind), for example, dual ring gears 645-1, 645-2 coupled to shaft 649 of input motor 625 and controlled by control motor 640 and voltage regulator 635 that may be located on land. The other branch of terminal 641 of module 620 provides a feedforward value of harnessed variable input voltage to voltage regulator 635 which also receives a feedback variable voltage via terminal 651 from output generator 650 and variable load of microgrid 660. Dual spur/helical or ring gear speed converter rotational speed output is provided by shaft 657 via input motor shaft 649 and shaft output sun gear 648-2 to output shaft gear 658 for turning connected electric voltage output generator 650. Similarly, a feedforward value of electric voltage is provided from terminal 641 connected to voltage regulator 635. A feedback variable voltage value reaches terminal 651 from generator 650 with first and second branches. One branch supplies an optimum variable electric voltage level to variable load 665 and to grid (micro-grid) 660 that is not limited by cut-out speed. The other branch passes the value of feedback variable generated voltage as a second feedback input to voltage regulator 635. Voltage regulator 635 compares the value of feedforward variable input voltage to the value of feedback variable generated voltage and outputs a control voltage value to control motor 640 via lead 643. In this manner, voltage regulator 635 uses voltage to control output generated rotational speed of generator 650 to produce an optimum value of output electric voltage delivered to a grid (or microgrid) of a variable load and is not limited to a cut-out rated power as per prior art FIGS. 5A and 5C.

Invention FIG. 6 further shows the connections to a "hummingbird" speed converter which may comprise first and second (dual) ring gears 645-1 and 645-2 connected together for outputting input motor 625 variable rotational speed received from harnessing module 620 by input shaft 649 to carrier gear assemblies 649-1, 649-2 and translated to sun gears 648-1, 648-2 for delivery as rotational speed to second ring gear 645-2 which is also driven by the rotational speed of second carrier gear assembly 649-2 also directly connected to input shaft 649. Output sun gear 648-2 is meshed with carrier gear and unnumbered planetary gears of carrier gear assembly 649-2 for outputting rotational speed to shaft sun gear 658 of output generator shaft 657 to output generator 650 of a control and generator module (components control motor 640 through output generator 650).

Meanwhile, voltage regulator 635 delivers a sample control voltage value determined by feedforward variable input voltage from terminal 641 connecting to the renewable energy harnessing module 620 and sampled feedback variable generated voltage from terminal 651 to control motor 649 having control shaft 647 for delivering a variable rotational control speed via shaft gear 656 via unnumbered connecting gears as rotational speed control input to first ring gear 645-1 of (optional dual spur/helical or) dual ring gear assembly shown which may, along with input motor 625, control motor 640, generator 650 and voltage regulator 635 may comprise a land module to receive variable harnessed renewable energy from a water/wind (even solar) energy harnessing module connected by electric cable to the land module (when a wind turbine is not located on an ocean or river). Any harnessing module of wind, water (and solar energy not shown) may be located typically in a river or may be located such as a wind turbine on an ocean or river platform. Furthermore, the "hummingbird" speed converter described in prior art patents and patent applications may be a dual ring gear or a dual spur/helical gear speed converter. Invention FIG. 7A and prior art FIGS. 7B through 7D show ways of implementing greater values of generated variable voltage through feed-forward and feedback, for example, using variable overlap generators.

Invention FIG. 7A shows how to boost generated electric voltage by varying the overlap of a rotor and stator of an output generator 750. Generator 750 is shown at a maximum value of overlap of rotor and stator. As taught in prior art patents of inventor (Kyung Soo Han), referred to herein as Key Han, the overlap of rotor and stator may be increased from a minimal overlap to a maximum overlap shown. More generation of electric voltage may also be provided by increasing the number of generator poles as shown in prior art FIG. 7C by providing multiple sets of poles added radially or by connecting a plurality of generators (four shown) by adding multiple sets of poles across a common shaft (multiple sets of poles added axially) as shown in prior art FIG. 7D where each generator may also have multiple sets of poles added radially per prior art FIG. 7C.

Referring again to invention FIG. 7A, more electric power generation may be generated when input rotational speed from an increased number of harnessing modules 720 (for water, wind or solar power) and more electric energy is suggested by the value of electric energy feedback from output generator 750 to a variable load 765 whose value of electric voltage delivered to the variable load 765 and grid 760 suggests adjusting the control motor 740 rotational speed so that more electricity may be generated. This means lower cut-in rotational speed (if possible) and higher cut-out speed (not a baseload value) such as suggested by prior art FIGS. 5A and 5C. Options for providing an optimum generated level of renewable energy voltage are to provide a variable number of energy poles or to connect generators in series to boost generation of an overlap generator. FIG. 7A shows generator 708 of a renewable energy harnessing module outputting most of generated voltage via terminal 741 to input motor 725 while a sample of generated voltage is fed forward to voltage regulator 735. A sample of output voltage of output generator 750 is fed back to voltage regulator 735. The voltage regulator 735 compares the feed forward voltage from energy harnessing module 720 and the feedback voltage from output generator 750 and outputs a control voltage to control motor 740 which outputs a control rotational speed to control motor 740 shaft 747 for turning shaft sun gear 746 and an unnumbered gear assembly for input to first and second three variable ring gear assemblies 745-1, 745-2, 748-1, 748-2 and planetary gear assemblies 749-1, 749-2 whose variable input to input motor 725 having shaft 749 to drive the planetary gear assemblies 749-1, 749-2 is controlled to constant frequency by the control motor 740 and output via an unnumbered split gear assembly meshed with shaft sun gear 758 to output generator 750. As already indicated, a difference between invention FIGS. 6 and 7A is the suggested use of a variable overlap generator, increasing poles, and generate electricity in series per prior art FIGS. 7B, 7C and 7D.

Invention FIG. 8 takes the suggestions of invention FIGS. 6, 7A, 7B and 7C to a further implementation. Invention FIG. 8 shows a plurality of river harnessing modules 820-1, 820-2, 820-3 and so on, for example, each comprising river energy concentric wing renewable energy collectors 804-1, 804-2, 804-3 in series, for example, along a river or in parallel across a river and suggests the use of other known river harnessing modules such as those with hatches and so on in combination with generators 808-1, 808-2 and 808-3, summing their three (or more) variable electric voltage feedforward outputs at junction box 823 (which may be land-based) and providing their summed variable input voltage and frequency (variable with the speed of mechanically turning the waterwheel 604 as a value fed forward from terminal 841 to voltage regulator 835 as well as most of generated voltage to input motor 825. In invention FIG. 8, a "hummingbird" speed converter 845-1, 845-2, 848-1, 848-2, 849-1, 849-2 is shown outputting a constant frequency and voltage to a variable load 865 and micro-grid 860 and at terminal 851 a sample feedback voltage of output generator 850 is also shown provided to voltage regulator 835 for comparison and development of a control voltage for operating control motor 840. Output generator 850 having output shaft 857 and shaft sun gear 858 provide rotational speed for running output generator 850. Output generator 850 in turn via terminal 851 provides a baseline voltage at constant frequency to variable load 865 and micro-grid 860 as well as feedback voltage value to voltage regulator 835 except feedforward voltage is shown for other than a concentric wing type water energy module comprising propeller 1112 and generator (wind or water harnessing module 1105) in invention FIG. 11.

The type of speed converter (dual ring gear) remains unchanged from invention FIGS. 6, 7A, 8, 9 to FIG. 10 but may be replaced, for example, by a spur/helical speed converter assembly or other form of "hummingbird" speed converter (not shown) while invention FIG. 11, to be discussed further herein, shows a renewable energy harnessing module with a propeller 1112 and generator 1114 for wind or water and first and second control motors 1165, 1170.

Invention FIG. 8 shows that the control voltage output of voltage regulator 835 is provided as the control voltage for operating a single control motor 840 which turns control motor shaft 847 integral with shaft sun gear 856 for turning first ring gear 845-1. Harnessing module 620 outputs variable voltage at variable frequency which is sampled at voltage regulator 835 and most of input variable voltage at variable frequency is delivered to input motor 625 whose shaft 649 rotational speed must be controlled to achieve constant baseline electric power. First ring gear 845-1 is meshed with carrier gear assembly 849-1 having planetary gears 849-1 and carrier assembly 848-1 connected to ring gear 845-2, planetary assembly 849-2 and carrier assembly 848-2 meshed with output sun gear 858 connected by unnumbered intermediate gears to second ring gear 845-2. Second ring gear 845-2 is meshed to second carrier gear assembly 849-2 integral with input motor shaft 849 of input motor 825. Second sun gear 848-2 is meshed to an unnumbered gear assembly for turning generator shaft gear 858 and generator shaft 857 to operate generator 850 for outputting baseline electricity at constant frequency which output generator 850 may be a variable overlap generator (per FIG. 7A) shown at maximum overlap. An optimum value of electric voltage is provided to variable load 865 and grid (micro-grid) 860 via terminal 851 via one branch of terminal 851 and the voltage value output by output generator 850 is provided as a feedback voltage sample to voltage regulator 835 by a second branch from terminal 851. Voltage regulator 835 provides control voltage to control motor 840 which in turn provides control rotational speed via shaft 847 and sun gear 856 to first ring gear 845-1.

Invention FIG. 9 shows how any renewable electric inputs, for example, from wind turbine harnessing modules 920 having rotors numbered 904-1, 906-1 and 908-1 and multiple serially connected generators connected axially numbered 820-1, 820-2 and 820-3, also 921-1, 921-2 and 921-3 plus multiple series-connected generators 922-1, 922-2 and 922-3, all of which capture variable wind velocities and so output variable electric power some of which may be insufficient to be summed at junction box 923 with, for example, other types of turbines will be seen in invention FIG. 10 and delivered to a "hummingbird speed converter" (dual ring gear speed converter assembly shown). For example, controls of onshore (land) wind turbines can be located on the ground level. It is now known that wind harnessing modules may be mounted on platforms in the ocean connected by underwater electric cables to junction box 923 on land for transmission by electrical cable 924 to a land module including, for example, terminal 941, input motor 925, voltage regulator 935, control motor 940 and output generator 950. Also, a variable grid load value at grid 960 may provide a feedback automatic control voltage value via terminal 951 to voltage regulator 935. Input captured renewable energy may be delivered from summation junction box 923 via electrical cable 924 to terminal 941 with branches to input motor 925 and a sample variable voltage output feed forward value at variable frequency to voltage regulator 935. The embodiment of a control and generating module may comprise a dual ring gear speed converter gear assembly of first and second ring gears and carrier gear assemblies or alternatively first and second spur/helical gear or miter/bevel gear assemblies and carrier gear assemblies in an alternative embodiment. The unnumbered dual ring gear assembly may have a mechanical rotational speed input provided by input motor 925 mechanically controlled by a control motor shaft sun gear of the control motor 940 shaft and receive a control input voltage from voltage regulator 935. As already introduced above, output generator 950 outputs a variable feedback output voltage value via a transformer 970 and terminal 951 to voltage regulator 935 and also outputs variable electric voltage that has been made constant and at constant frequency generated by output generator 950 via the transformer 970 to grid 960. Transformer 970 may be used to compensate for variations in output electrical frequency of output generator 950. Such a compensating transformer may be utilized in any of the embodiments of the invention as it may compare a known desired frequency with the output electrical frequency or make a selectable change from, for example, 50 Hz to 60 Hz or vice versa. Each renewable energy harnessing module 920 is exemplified by a propeller 904-1, 906-1, 908-1 and associated propeller shaft 904-1, 906-1 and 908-1 which turns multiple pole generators 820-1, 820-2, 820-3; 921-1, 921-2, 921-3; and 922-1, 922-2, 922-3 at a variable rotational speed determined by water or wind flow direction and speed. One output lead may deliver variable voltage at variable frequency to summer 923. Two other leads shown may be used to deliver and forward power from other renewable harnessing modules (not shown) to summer 923 and via electrical cable 924 to terminal 941 which delivers a sample of collected voltage at variable frequency to voltage regulator 935 and most of received collected voltage at variable frequency to input motor 925. A dotted input motor shaft has two sun gears which directly connect to each of two carrier gear assemblies for driving an unnumbered split gear assembly and an unnumbered sun gear of an unnumbered output generator shaft of output generator 950.

Invention FIG. 10 shows the concept that any renewable energy (including direct current solar panels 1024) as well as horizontal axis wind turbines 1019, 1021, vertical axis wind turbines 1022, river turbine harnessing modules 1020-1 comprising concentric wings 1004-land generators 1008-1 (harnessing module 1020-1), tidal turbines 1010, wave (ocean) turbines 1012 and ocean current turbines comprising, for example, concentric wings 1014-1 and generators 1018-1. Solar panel 1024 typically outputs direct current voltage which may be converted to alternating current before reaching terminal 1025-1 of junction box 1023 and summed with other alternating current voltage inputs provided at terminals 1025-2 through 1025-10. While input motor 1055 typically receives alternating current values of voltage, a direct current to alternating current generator (not shown) may be used and dedicated to all solar panel direct current inputs from solar panel inputs 1024 and provide a variable alternating current voltage via electrical junction box 1023 (typically on land) via input motor 1055 as a second rotational speed input to input shaft 1049.

Referring further to the dual ring gear speed converter (comprising dual ring gears 1045-1, 1045-2) of invention FIG. 10, invention FIG. 10 comprises first and second dual ring gears 1045-1 and 1045-2 connected to an unnumbered split gear assembly to sun gear 1087-1 of control motor shaft 1087 of control motor 1085. The input motor shaft 1049 of input motor 1055 has first and second unnumbered, dotted sun gears which mesh with first and second carrier gear assemblies 1049-1 and 1049-2 surrounding input motor shaft 1049, control motor 1040 having motor shaft 1087 and shaft sun gear 1087-1, input motor 1055 having integral first and second planetary gear assemblies 10410-1 and 1049-2 driven by the unnumbered dotted sun gears and having output sun/sheath/sun output gears 1048-1, 1048-2 which mesh with unnumbered split gear assemblies to connect to output sun gear 1057-1 of output generator shaft 1057 which drives output generator 1050. Sun gear 1057-1 drives output generator 1050 providing optimum electric voltage to branch terminal 1065 which either provides output electricity to either grid 1060 or variable load 1065 or provides feedback voltage to voltage regulator (V/R) 1035, all shown in the same detail as shown in invention FIGS. 6, 7A, 8 and 9. Invention FIG. 10 further shows input motor 1055, control motor 1085 and output generator 1050 providing optimum constant baseload value voltage at constant frequency to variable load 1065 and grid (micro-grid) 1060 via terminal 1066 and, as stated above, having a second branch from terminal 1066 to provide a feedback voltage signal from output generator 1050 voltage value to voltage regulator (V/R) 1035. Voltage regulator 1035 receives a variable value of input electrical voltage from electrical junction box 1023 via cable 1026 to terminal 1041 with a first branch from terminal 1041 to input motor 1055 and a second sample branch to voltage regulator (V/R) 1035. The controlling and generating module may be typically located on land. Electrical junction box 1023 may collect variable voltage at variable frequency including direct current from all connected renewable energy harnessing modules: solar panel 1024, vertical-axis wind turbine 1022, horizontal-axis wind turbine 1019, generator 1021, river flow renewable energy harnessing module 1020-1 comprising a river turbine of a waterwheel 1004-1 and variable electricity generator 1008-1, a tidal turbine 1010, a wave turbine 1012, and an ocean current turbine 1014-1 with generator 1018-1 located below a platform facing the ocean current.

Invention FIG. 11 is an example of a wind or water renewable energy harnessing module 1105 (this module may be directed by a vane known in the technical field of wind mills to face the wind or water from any direction) comprising propeller 1112 (and associated shaft) driving input generator 1114 having a variable resistance 1127 via terminal 1128 to generate most of the variable input electric voltage of generator 1114 for operating input motor 1125. A sample of feedforward voltage from harnessing module 1105 is passed via a variable resistance 1127 and terminal 1128 to voltage regulator (V/R) 1130 for sampling input electric power from harnessing module 1105 operating at variable power and variable frequency. Meanwhile, most of the harnessed variable voltage at variable frequency (depending on the speed of rotation of propeller 1112 due to wind or water speed) is sent to input motor 1125. Variable load 1127 may be used to compensate, for example, for weathery conditions causing extreme values of electricity input from energy harnessing module 1105 such as during hurricane force winds or flood water flow which may overpower input motor 1125 via feedback control of input motor 1125 from wind speed and water flow rate meters (not shown) used to compare wind or water flow rates with known hazardous flow rates (not shown). All speed converter, control motor and variable voltage mechanical components are contained within housing 1140 to protect them from weather or weathery conditions. There may be floating platforms for both wind and water flow energy capture or a fixed platform in wind or water for wind or water flow capture. It is known in the art to provide for wind turbine farms on land and sea. Clearly, variable input voltage at variable frequency captured by a renewable energy harnessing module 1105 must be controlled to constant frequency output before reaching output generator 1190 electric power cable 1186 to load 1185. Therefore, housing 1140 should be in an alternative embodiment capable of enclosing, for example, a wind or water flow harnessing module 1105 in its own housing separate from housing 1140. Also, electrical components outside of depicted housing 1140 may be enclosed within a separate housing, for example, on land comprising the input motor 1125, the voltage regulator 1130, both control motors 1165 and 1170, the voltage regulator 1130, both manual variable voltage transformers 1180 and 1181 and the output generator 1190 comprising stator 1193, rotor 1192 and shaft 1144 entering container 1140.

Voltage regulator (V/R) 1130, which may be located outside housing 1140 (which, according to the depicted embodiment, houses mechanical components susceptible to weather conditions), compares a feed forward voltage sample from harnessing module 1105 with a variable feedback voltage from output generator 1190 located outside housing 1140 via terminal 1151 in order to output a controlled constant frequency, for example, 60 Hz and output voltage (power) within a permissible range of baseload electrical power output from output generator 1190 to a variable load 1185 and variable grid load 1195 via electric power cable 1186.

First control motor 1165 receives a control voltage via lead 1131 from voltage regulator 1130. The voltage regulator 1130 receives a feed forward sample of variable electric power at variable frequency from terminal 1128. The voltage regulator 1130 also receives a feedback sample voltage from terminal 1151 of output generator 1190 for assisting in controlling the frequency to, for example, 60 Hz of output electricity by output generator 1190. Output electricity generator 1190 receives a control rotational speed via control motor 1165 and control motor 1170 consistent with a desired output electricity generator 1190 output frequency of, for example, 60 Hz. The voltage regulator 1130 outputs a feed forward control signal via terminal 1141, variable voltage transformer 1181 and variable voltage transformer 1180 to control motor 1170. Control motor 1165 having control motor 1165 shaft 1172-1 has integral sun gear 1189 which meshes with first spur/helical gear transgear assembly 1143 with an unnumbered sun/sheath/sun output gear surrounding control motor 1165 shaft 1172-1. Planetary gear 1157-1 connects via reverse L shaped gear 1145-2 to first sun gear integral with shaft 1172-2 of control motor 1170. Second integral sun gear 1172-3 of second control motor 1170 shaft 1172-2 meshes with split gears 1151-1 and 1151-2 to mesh with first ring gear assembly 1156-1.

Second control motor 1170 having control motor 1170 integral shaft sun gears 1172-3 and 1172-4, the second integral sun gear 1172-4 operates bottom spur/helical gear assembly 1143 having planetary gear 1157-1. First integral sun gear 1172-3 of control motor 1170 meshes with split gear 1151-1 surrounding input motor 1125 shaft 1152 and split gear 1151-1 meshes with split gear 1151-2 surrounding output generator 1190 shaft 1144 such that split gear 1151-2 meshes with first ring gear assembly 1156-1. First and second connected ring gear assemblies 1156-1, 1153-1; 1156-2, 1153-2 and second top spur/helical transgear gear assembly 1144 including planetary gear 1157-2 control rotational output speed to be consistent with output generator 1190 outputting, for example, constant frequency 60 Hz at baseload constant voltage to variable load 1185 and grid 1195.

First control motor 1165 shaft 1172-1 turns independently from the turning of knob shaft 1173-1 of variable voltage transformer (VVT) 1180. (VVT) 1180 knob shaft 1173-1 has sun gear 1176-1 meshed with sun/sheath/sun gear 1173-4 surrounding control motor 1170 shaft 1172-2. One may manually adjust control motor 1170 control voltage via knob shaft 1173-1 of variable voltage transformer 1181. Sun/sheath sun gear 1173-4 meshes with top spur/helical gear assembly 1154-1 and with integral sun gear 1174-3 of variable voltage transformer 1180 shaft 1173-1. One may manually adjust the control rotational speed of output generator 1190 shaft 1144 via sun gear 1144-2.

Support structure assembly 1174 comprises components 1174-1, 1174-2 and 1174-3 which support the turning of variable voltage transformer 1181 knob shaft 1173-2 having integral sun/sheath/sun gear 1173-3 which meshes with bottom planetary spur/helical gear assembly 1143 having planetary gear 1157-1. Support structure assembly components 1174-2 and 1174-3 support the independent turning of control motor 1172-1 control motor shaft 1172-1 and variable voltage transformer 1180 knob shaft 1173-1. Variable voltage transformer 1180 knob extended shaft 1173-1 and integral sun gear 1176-1 which meshes with sun/sheath/sun gear 1173-4 surrounding control motor 1170 shaft 1172-2 to second top planetary gear, spur/helical gear assembly 1154-1. Variable voltage transformer (VVT) 1180, 1181 knob shafts 1173-1, 1173-2 are for manually adjusting control motor 1165 and control motor 1170 input control voltages. Once set, the knobs of VVT's 1180, 1181 need not be manually reset again once set but may succumb to some minor additional adjustment.

Input motor 1125 shaft 1152 receives most of the captured output electric voltage of renewable water or wind harnessing module 1105. Input motor 1125 has first and second unnumbered integral sun gears which turn at a rotational speed dependent on water and wind flow speeds (and directions of flow). These first and second integral unnumbered sun gears drive first and second gear assemblies 1163-1 and 1163-2 which indirectly turn sun gear 1144-1 of output generator 1190 shaft 1144 at a variable rotational speed and electric power dependent on the input electricity received by input motor 1125 from harnessing module 1105. More specifically, first gear assembly 1153-1 meshes with unnumbered output sun/sheath/sun gear which meshes with split gear 1152-3 surrounding output generator 1190 shaft 1144. Split gear 1152-3 meshes split gear 1152-2 which surrounds input motor 1125 shaft 1152 and meshes with output generator 1190 shaft 1144 first integral sun gear 1144-1. Thus, most of the output rotational speed of input motor 1125 shaft 1152 is delivered to first integral sun gear 1144-1 of output generator 1190 shaft 1144. Second integral sun gear 1144-2 of output generator 1190 shaft 1144 is turned by and meshed with output sun/sheath/sun gear 1145-1 which comprises an input from control motors 1165 and 1170 discussed below for controlling a variable output of renewable wind and water energy module 1105 at a constant frequency such as 60 Hz and at least a constant level of baseload electric power when it is output by output generator 1190. Output generator 1190 hopefully outputs sufficient electric power to usefully contribute to grid power output via lead 1186 to variable load 1185 to grid terminal 1195. Output generator 1190 outputs electricity as controlled by first and second control motors 1165 and 1170 controlled by sample feed forward voltage captured electric power output from terminal 1128 and sample feedback electric power output from terminal 1151 of output generator 1190 should be at constant frequency and constant baseload electric power. Control motors 1170 and 1165 will be discussed further herein.

Second control motor 1170 connects to a first ring gear speed converter 1156-1, gear assembly 1153-1, via first integral sun gear 1172-3 of control motor 1170 shaft 1172-2 meshing with split gears 1151-1 and 1152-2 where split gear 1151-1 surrounds input motor 1125 shaft 1152 and split gear 1151-2 surrounds shaft 1144 of output generator 1190 where split gear 1152-2 meshes with first ring gear 1156-1 of first and second connected ring gear assemblies. Gear assembly 1153-1 turns with ring gear 1156-1 and includes integral sun gear of assembly 1153-1 which mesh with an unnumbered sun/sheath/sun output gear meshing with split gear 1152-1 surrounding output generator 1190 shaft 1144 to mesh with second ring gear speed converter 1156-2 and gear assembly 1153-2. The unnumbered sun/sheath/sun output gear of assembly 1153-2 surrounding input motor 1125 shaft 1152 meshes with split gear 1152-3 surrounding output generator 1190 shaft 1144. Split gear 1152-3 meshes with split gear 1152-2 surrounding input motor 1125 shaft 1152. Split gear 1152-2 meshes with sun gear 1152-4 of output generator 1192 shaft 1144 first sun gear 1144-1 of output generator 1190 shaft 1144 to help turn output generator 1190 shaft 1144 at high variable rotational speed and variable electric power.

Second control motor 1170 shaft 1172-2 has a second sun gear 1172-4 which meshes with input sun/sheath/sun gear 1152-4 surrounding input motor 1125 shaft 1152, input sun/sheath/sun gear 1152-4 meshed with cross-hatched spur/helical gear assembly 1144. Output sun/sheath sun gear 1145-1 of spur/helical gear assembly 1144 meshes with output generator 1190 shaft 1144 second sun gear 1144-2 of output generator 1190 shaft to help control rotational speed of output generator 1190 shaft 1144. Sun gear 1172-3 of second control motor 1170 shaft 1172-2 connects to split gear 1151-1 which surrounds input motor 1125 shaft 1152. Split gear 1151-1 meshes with split gear 1151-2 which surrounds output generator 1192 shaft 1144 to turn first ring gear 1156-1 of an unnumbered dual series-connected ring gear assembly including second ring gear 1156-2. A cross-hatched carrier gear assembly 1153-2 of second ring gear assembly 1156-2, 1153-2 connects via an unnumbered sun/sheath/sun gear to a split gear assembly comprising split gear 1152-3 surrounding output generator 1190 shaft 1144 meshing with split gear 1145-1 surrounding input motor 1125 shaft 1152 to mesh with sun gear 1152-4 of output generator 1190 shaft 1144. First sun gear 1152-4 helps turn output generator 1190 shaft 1144 at a constant rotational speed so that output generator 1190 outputs a constant frequency such as 60 Hz to load 1195. The sun/sheath/sun output gear 1145-1 of second cross-hatched spur gear assembly 1154-1 surrounding input motor shaft 1152 meshes with integral sun gear 1144-2 of output generator 1190 shaft 1144 to help control output generator rotational speed constant so that output generator electric power may be at constant electrical frequency such as 60 Hz. An unnumbered output sun/sheath/sun gear of second cross-hatched spur/helical gear assembly 1154-1 turns at a constant rotational speed so as to control rotational speed of output generator 1190 speed to a constant value.

Support structure assembly 1174 (shaded) components 1174-1, 1174-2 and 1174-3 supporting independent control motor shaft 1172-1 (rotating independently of VVT 1180 knob shaft 1173-1) outputs a rotational output received by cross-hatched planetary gear 1157-1 of bottom spur/helical gear assembly 1143 to assist control motor 1165 and control motor 1170. A manual turning of knob shaft 1173-1 of VVT 1181 delivered via a cross-hatched, sun/sheath/sun gear 1173-3 of knob shaft 1173-1 to assembly 1143 assists control motor 1170. Support structure assembly components 1174-1, 1174-2 and 1174-3 also support a shaded knob control shaft 1173-2 of VVT 1181 for delivering a control signal 1182 to a manually turned extended shaft 1173-1 to control rotational speed of output generator 1190.

First upper unnumbered but cross-hatched spur/helical transgear gear speed converter 1154-1 comprises an output sun/sheath/sun gear 1145-1 surrounding input motor 1125 shaft 1152 which meshes with second integral sun gear 1144-2 which transfers a control rotational speed to correct any rotational speed issues or harnessed electric power issues caused by input motor 1125 shaft 1152 input rotational speed. The second unnumbered spur/helical gear assembly 1143 is downward vertically connected to shaded sun/shaft/sun gear 1173-3 of knob shaft 1173-1 indirectly to an unnumbered far right sun gear 1144-2 of output generator 1190 shaft 1144. Second control motor 1170 has a control motor shaft 1172-2 having an integral sun gear 1172-3 and receives control rotational speed from second control motor 1170 shaft second integral sun gear 1172-4. First integral sun gear 1172-3 of control motor 1170 shaft 1172-2 connects to split gear assembly 1151-1, 1151-2 (meshed together with sun gear 1172-3) which rotates first ring gear assembly 1156-1, 1153-2. Connected sun gear 1172-3 of control motor 1170 shaft 1172-2 further connects to split gear assembly 1151-1, 1151-2 and then to connected ring gears 1156-1, 1156-2 and to first integral sun gear 1144-1 of output generator 1190 shaft 1144 to deliver rotational speed captured by energy harnessing module 1105. A second integral sun gear 1144-2 of output generator 1192 shaft 1144 meshes with output sun/sheath sun gear 1145-1 which is part of spur/helical gear transgear assembly 1154-1 and controls rotation of output generator 1190 to constant shaft 1144 rotational speed and output electric power frequency at electric cable 1186 to grid 1185.

Of the two sun gears 1144-1 and 1144-2 of output generator 1190 shaft 1144, from left to right, are turned by input motor 1125 shaft 1152 for speed and control, for example, via split gear assembly 1151-1, 1151-2. The split gear assembly 1151-1, 1151-2 meshes with control motor 1170 shaft 1172-2 sun gear 1172-3 by unnumbered sun/sheath/sun gears meshing with four planetary gears 1158-1, 1158-2, 1158-3 and 1158-4. The unnumbered sun/sheath/sun gears mesh with the four planetary gears 1158-1, 1158-2, 1158-3 and 1158-4 of ring gear assemblies 1156-1, 1156-2 respectively. Split gears 1152-1, 1152-3 connect ring gear assemblies to 1156-1 to 1156-2 and to output generator 1190. Planetary gear 1158-4 meshes with split gears 1152-2 and 1152-3 to mesh with output generator shaft 1190 sun gear 1144-1. Support structure assembly 1174 independently supporting knob control shaft 1173-2 and extended shaft 1173-1 as well as first control motor 1165 shaft 1172-1, for example for controlling spur/helical gear assemblies 1143 and 1154-1 which may be manually controlled via VVT 1181 via knob shaft 1173-2 to output a control voltage via lead 1182 to VVT 1184 and to output via lead 1184 a control voltage to control motor 1170 derived from sample feed forward voltage obtained from terminal 1141. Note that knob shaft 1173-2 is a shaft supported by support structure assembly 1174 extending from spur/helical gear assembly 1143 through support structure assembly 1174 to a terminal of VVT 1181. VVT 1180 knob shaft 1173-1 is independently rotated from first control motor 1165 shaft 1172-1 and rotates sun gear 1176-1 connected by sun/sheath/sun gear 1173-4 to spur/helical gear assembly 1154-1. First control motor 1165 shaft 1172-1 has sun gear 1189 which meshes with first spur/helical gear transgear assembly 1143 which is also controlled via second control motor 1170 shaft 1172. including step gear 1151-1 which turns first ring gear 1156-1. Input motor shaft 1152 has two unnumbered sun gears shown in the same cross hatch as shaft 1152 which sun gears are directly driving first and second ring gear carrier gear assemblies 1152-1 and 1152-2 so that second ring gear assembly 1156-2, 1153-2 may output via split gears 1152-3 and 1152-2 meshed with each other and with unnumbered output sun/sheath sun gear of gear assembly 1153-2 as much rotational speed input of input motor 1125 shaft 1152 as possible. Invention FIG. 11 is the first invention figure to show first and second control motors 1165 and 1170 to control output generator 1190 shaft 1144 rotational speed via second integral sun gear 1144-2.

The principles of application of the several discussed embodiments of a structure and method of constructing same for, for example, providing a green renewable energy alternative to the burning of fuel such as coal, oil or other less environmentally friendly energy sources have been demonstrated above comprising a harnessing module specially designed and located to produce at least a predetermined value of harnessed renewable energy to produce a constant baseload amount of power to a load. A controlling and generating module may use a pair of spur/helical gear assemblies of sun gears and planetary gears, a pair of bevel/miter gear assemblies and a pair of series-connected ring gear speed converters of an input motor shaft and carrier gear assemblies for output (a dual spur/helical, bevel/miter or series-connected ring gear speed converter assembly) and at least one accompanying control motor and a voltage regulator may be used to compare variable voltage values as feed forward input by a plurality of different types of harnessing modules which may input variable alternating or direct current voltage values which are fed forward to a voltage regulator (most of captured water or wind flow energy being forwarded as output electric energy to an input motor). The voltage regulator may receive both a feed forward and a fed back variable voltage value from an output generator for output to a variable load for comparison with the variable fed forward voltage value (AC or DC) received from a variety of renewable energy harnessing modules. The present embodiments used in conjunction with known flow energy turbine systems may or may not need be enhanced by using many known control systems for improved operation such as pitch and yaw control in wind turbines which are adaptable for use as propeller-driven river turbine harnessing modules, control responsive to power grid statistics and requirements and remote or automatic control responsive to predicted and actual weather conditions (river velocity from weather forecasts, an anemometer, water flow velocity from a water flow velocity meter, torque control via a torque meter, barometric reading and direction (rising or falling) and the like). A three variable to constant speed converter may be a dual ring gear speed converter (or in alternative embodiments, a dual spur/helical speed converter, and may receive a control signal from a voltage regulator for a control motor for controlling the output rotational speed to run an output generator at a constant rotational speed (the output of the output generator being constant frequency in Hertz) or maintain a direct current capability along with use of a variable power generator of a control and generating module in these embodiments. These and other features of embodiments and aspects of a variable energy flow input, constant output system and method may come to mind from reading the above detailed description, and any claimed invention should be only deemed limited by the scope of the claims to follow. Moreover, the Abstract should not be considered limiting. Any patent applications, issued patents and citations to published articles mentioned herein should be considered incorporated by reference herein in their entirety.

I claim:

1. A control and electric power generating assembly for controlling a feed forward variable voltage input from at least one renewable energy harnessing module and a feedback variable voltage from a variable load output of an output generator by comparing the feed forward and feedback variable voltages at a voltage regulator, the control and electric power generating assembly comprising:
the voltage regulator for outputting a control voltage signal to automatically control a control motor, the control motor having a control motor shaft, the control motor for controlling first and second series-connected ring transgear gear speed converters; an output rotational speed of the control motor shaft being mechanically transmitted to the first and second series-connected ring gear transgear speed converters,
an input motor having shaft with first and second sun gears, the input motor for receiving most of the feed forward variable voltage input from the at least one renewable energy harnessing module, the first and second sun gears of the input motor shaft turning first and second planetary gear assemblies controlled by the control motor,
the control motor, comprising the control motor shaft, receiving the control voltage signal from the voltage regulator and the control motor shaft having an integral sun gear such that, via a split gear assembly, a control rotational speed is delivered to the first of the first and second series-connected ring gear transgear speed converters,
the second of the first and second series-connected ring gear transgear speed converters having an output gear assembly for turning a sun gear of a shaft of the output generator by rotationally turning the output generator shaft at constant rotational speed and such that the output generator having the output generator shaft outputs constant frequency electric voltage to a variable load, while a sample voltage of the output generator is fed back to the voltage regulator.

2. The control and generating assembly of claim 1 further comprising a transformer-controlled output of the output generator.

3. The control and generating assembly of claim 1 further comprising the output generator having poles added axially to the output generator.

4. The control and generating assembly of claim 1 further comprising the output generator having poles added axially to the output generator.

5. The control and generating assembly of claim 1 further comprising the output generator having poles added radially to the output generator.

6. The control and generating assembly of claim 5 wherein the plurality of renewable energy harnessing modules comprises at least one of a horizontal-axis wind turbine, a vertical-axis wind turbine, a solar panel, a river turbine, a tidal turbine, a wave turbine, and an ocean current turbine.

7. The control and generating assembly of claim 1 further comprising a plurality of renewable energy harnessing modules for capturing one of wind and water flow energy and outputting a captured variable voltage from the plurality of renewable energy harnessing modules, the captured variable voltage from the plurality of renewable energy harnessing modules being received at an electrical junction box from which the captured variable voltage from the plurality of renewable energy harnessing modules is provided to the control and generating assembly.

8. The control and generating assembly of claim 1 wherein the output generator comprises a variable overlap generator for varying the overlap of a rotor and a stator of the output generator.

9. The control and generating assembly of claim 8 further comprising a variable load between the at least one renewable energy harnessing module and a terminal between the input motor and the voltage regulator for use for compensating for weathery conditions.

10. A control and generating assembly for controlling a feed forward variable voltage input from at least one renewable energy harnessing module and a feedback variable voltage from a variable load output of an output generator by comparing the feed forward variable voltage from the at least one renewable energy harnessing module and the feedback variable voltage from the variable load output of the output generator at a voltage regulator comprising:
an input motor for receiving most of the feed forward variable voltage input from the at least one renewable energy harnessing module and the input motor having a shaft with integral first and second sun gears having first, second, third and fourth planetary gears for connecting a first series-connected ring gear assembly to a second series-connected ring gear assembly, the second series-connected ring gear assembly being connected via a split gear assembly to one of an integral and a connected second sun gear of a rotatable shaft of the output generator;
the voltage regulator for outputting a control voltage signal to automatically control a first control motor having a first control motor shaft having one of an integral and a connected sun gear for controlling bottom planetary gear spur/helical gear assembly such that an output rotational speed of the first control motor shaft is mechanically transmitted to one of an integral and a connected first sun gear of a shaft of the second control motor,
the second control motor having the shaft of the second control motor with the one of the connected first sun gear of the second control motor and one of an integral and connected second sun gear of the shaft of the second control motor, the one of the second integral and connected second sun gear of the shaft of the second control motor meshed with a split gear assembly to actuate the first and second series-connected ring transgear gear speed converters, the rotatable shaft of the output generator-shaft receives variable frequency voltage at a first output generator shaft sun gear meshed with a first sun gear/sheath/a second sun gear to a second planetary gear of a top planetary gear spur/helical gear assembly and a mechanical correction control rotational speed from the first and second control motors.

* * * * *